(12) United States Patent
Chen et al.

(10) Patent No.: US 7,394,935 B2
(45) Date of Patent: Jul. 1, 2008

(54) SYSTEM AND METHOD FOR EDITING A HAND-DRAWN CHART IN INK INPUT

(75) Inventors: Tongxian Chen, Beijing (CN); Yantao Li, Beijing (CN); Jian Wang, Beijing (CN); Xianfang Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/096,037

(22) Filed: Mar. 30, 2005

(65) Prior Publication Data

US 2006/0061780 A1 Mar. 23, 2006

Related U.S. Application Data

(60) Provisional application No. 60/612,122, filed on Sep. 21, 2004.

(51) Int. Cl.
*G06K 9/00* (2006.01)
*G06F 17/00* (2006.01)

(52) U.S. Cl. .................. 382/181; 382/186; 715/255

(58) Field of Classification Search ............ 382/181, 382/185–189, 203, 209, 218, 224; 715/509, 715/517, 5, 227, 243, 255
See application file for complete search history.

(56) References Cited

U.S. PATENT DOCUMENTS

| | | | |
|---|---|---|---|
| 4,727,588 A | 2/1988 | Fox | |
| 5,398,310 A | 3/1995 | Tchao | |
| 5,502,803 A | 3/1996 | Yoshida et al. | |
| 5,513,309 A * | 4/1996 | Meier et al. | 715/860 |
| 5,517,578 A | 5/1996 | Altman | |
| 5,717,939 A | 2/1998 | Bricklin | |
| 5,835,916 A | 11/1998 | Inaki et al. | |
| 5,907,852 A | 5/1999 | Yamada | |
| 6,167,411 A | 12/2000 | Narayanaswamy | |
| 6,317,762 B1 | 11/2001 | Okawa | |
| 6,340,967 B1 | 1/2002 | Maxted | |
| 6,459,442 B1 * | 10/2002 | Edwards et al. | 715/863 |
| 6,525,749 B1 * | 2/2003 | Moran et al. | 715/863 |
| 6,535,897 B1 | 3/2003 | Altman | |
| 6,626,955 B1 | 9/2003 | Agrawal et al. | |
| 6,952,803 B1 * | 10/2005 | Bloomberg et al. | 715/530 |

(Continued)

OTHER PUBLICATIONS

Office Action in related case U.S. Appl. No. 11/095,994 mailed Jun. 6, 2007.

(Continued)

*Primary Examiner*—Daniel G Mariam
(74) *Attorney, Agent, or Firm*—Workman Nydegger

(57) ABSTRACT

A system and method for editing ink objects recognized in ink input is provided. An ink parser may recognize an ink object in ink input and then an ink editing user interface may edit the ink object recognized by the ink parser. The ink parser may include a chart detector, shape recognizer, and various ink object recognizers such as a chart recognizer, a list detector and a table detector. The various ink object recognizers may recognize particular ink objects. The ink editing user interface may edit the ink object recognized by the ink parser. The ink editing user interface may include a chart editor, list editor, table editor, mode switcher, and a visualizer. The mode switcher may switch the ink editing system between inking mode and ink editing mode.

20 Claims, 24 Drawing Sheets

U.S. PATENT DOCUMENTS

| | | |
|---|---|---|
| 7,002,560 B2 | 2/2006 | Graham |
| 2002/0049796 A1 | 4/2002 | Dresevic |
| 2003/0028851 A1 | 2/2003 | Leung |
| 2003/0179201 A1 | 9/2003 | Thacker |
| 2004/0054701 A1* | 3/2004 | Garst .......................... 708/131 |
| 2004/0090439 A1* | 5/2004 | Dillner ....................... 345/440 |
| 2004/0199877 A1 | 10/2004 | Yasuda |

OTHER PUBLICATIONS

Office Action in related case U.S. Appl. No. 11/094,914 mailed Sep. 11, 2007.

Office Action in related case U.S. Appl. No. 11/095,994 mailed Feb. 1, 2008.

Office Action in related case U.S. Appl. No. 11/095,452 mailed Dec. 11, 2007.

* cited by examiner

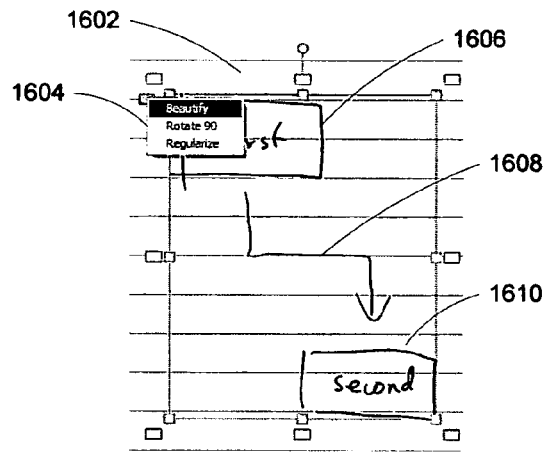
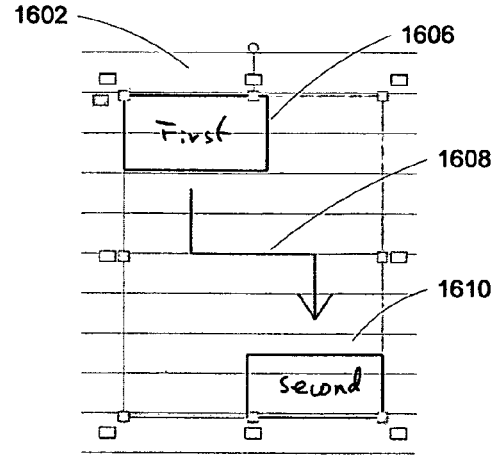
FIG. 16A        FIG. 16B
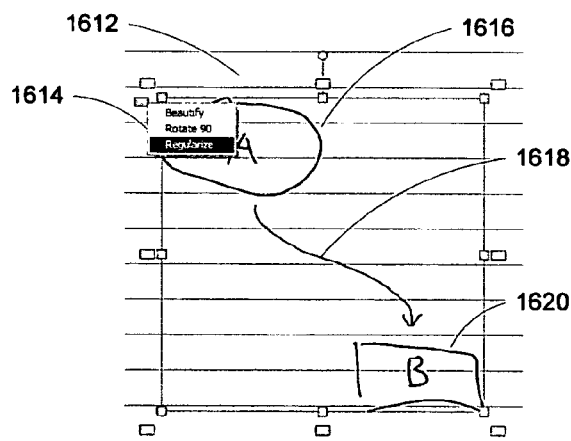
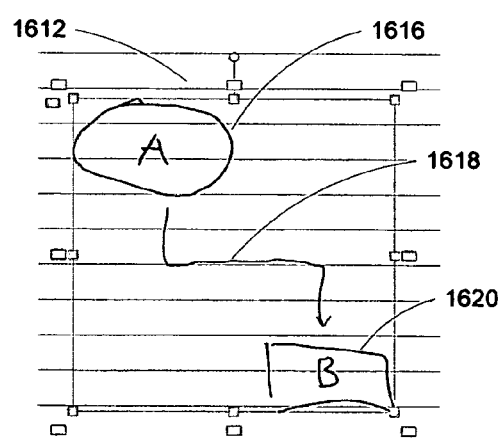
FIG. 16C        FIG. 16D

SYSTEM AND METHOD FOR EDITING A HAND-DRAWN CHART IN INK INPUT

CROSS-REFERENCE TO RELATED APPLICATIONS

The present invention claims priority to U.S. provisional patent application Ser. No. 60/612,122 filed Sep. 21, 2004, and incorporated herein in its entirety.

The present invention is related to the following United States patent applications, filed concurrently herewith and incorporated herein in their entireties:

U.S. patent application Ser. No. 11/095,994 "System And Method For Editing a Hand-Drawn List In Ink Input,"

U.S. patent application Ser. No. 11/094,914 "System And Method For Editing a Hand-Drawn List In Ink Input," and U.S. patent application Ser. No. 11/095,452 "System And Method For Editing a Hand-Drawn Table In Ink Input."

FIELD OF THE INVENTION

The invention relates generally to computer systems, and more particularly to an improved system and method for editing ink objects recognized in ink input.

BACKGROUND OF THE INVENTION

The ability to recognize various types of ink objects is important for users to be able to draw directly on their computers using ink input or ink notes. Current hardware and software may be able to capture ink representing handwriting reasonably well but is currently unable to similarly recognize and represent the meaning of diagrams, charts, lists and tables hand-drawn in ink input. As a result, users instead use menu-based application programs to create drawings of ink objects such as diagrams and charts. Various diagrams, charts, lists, and tables may be presented by such application programs for a user to select and copy onto a drawing grid or into a document for editing. For example, a drawing application may include a menu option for inserting a diagram, organization chart, or table in a document for editing.

Research focused on recognition of hand-drawn objects has yielded marginal results to date. For instance, incremental recognition algorithms have been used that may recognize simple geometric shapes such as a circle or a box from a specific number of strokes made in a particular order. However, such incremental algorithms rely on stroke order and/or assume a particular number of strokes in order to recognize a particular hand-drawn object. Such an approach fails to be robust for several reasons. For one, none of the incremental algorithms solves the grouping problem of deciding which collection of strokes belongs together because those strokes represent a specific shape or hand-drawn object such as a chart or list. Without the ability to group strokes together that belong to a shape or hand-drawn object, incremental algorithms may not accommodate multi-stroke shapes or hand-drawn objects such as a diagram, chart, list, table, and so forth.

What is needed is a way for recognizing and representing the meaning of hand-drawn objects that is insensitive to stroke input order and/or the number of strokes required to form any given drawing object. Any such system and method should be able to detect multi-stroke hand-drawn ink objects and be able to decide which collection of strokes belong together that represent different ink objects such as a diagram, chart, list, table and so forth. Furthermore, such a system and method should be able to provide a way to edit recognized ink objects.

SUMMARY OF THE INVENTION

Briefly, the present invention provides a system and method for editing ink objects recognized in ink input. To this end, an ink parser that may recognize an ink object in ink input may be operably coupled to an ink editing user interface that may edit the ink object recognized by the ink parser. The ink parser may include an operably coupled chart detector, shape recognizer, and various ink object recognizers such as a chart recognizer, a list detector and a table detector. The chart detector may include a container detector for detecting the containers within ink input and a connector detector for detecting the connectors in ink input. The shape recognizer may include a container recognizer for recognizing containers in ink input and a connector recognizer for recognizing connectors in ink input. The various ink object recognizers may recognize particular ink objects. For example, the chart recognizer may recognize a hand-drawn chart or diagram in ink input. The list detector may recognize a hand-drawn list in ink input. And the table detector may recognize a hand-drawn table in ink input.

The ink editing user interface may edit the ink object recognized by the ink parser. The ink editing user interface may include an operably coupled chart editor, list editor, table editor, mode switcher, and a visualizer. The chart editor may be used for editing a hand-drawn chart recognized by the ink parser. The list editor may be used for editing a hand-drawn list recognized by the ink parser. And the table editor may be used for editing a hand-drawn table recognized by the ink parser. The visualizer may display a chart representing the information in a hand-drawn table recognized by the ink parser. Finally, the mode switcher may switch the ink editing system between inking mode and ink editing mode.

In one embodiment, ink object recognition may be performed for ink input received and parsed. Then the ink editing system may switch from inking mode to editing mode for editing an ink object recognized in the ink input. Editing operations may be performed to edit the ink object. Then the ink representing the edited ink object may be regenerated. The ink editing system may remain in ink editing mode or may switch back to inking mode to receive additional ink input.

To perform ink object recognition, ink input may be parsed and ink object detection may be performed to detect an ink object in the ink input. Next, shape recognition may be performed to recognize containers and connectors detected within the ink input. Then, ink object recognition may be performed for a particular ink object such as a diagram, chart, list, table and so forth. Once the ink object is recognized, the ink editing system may switch to ink editing mode and create a bounding box around the recognized ink object with a selectable widget. Editing operations may then be presented for the particular ink object using the selectable widget that may display a menu of the editing operations. The editing operations may be selected and performed on the ink object, and ink representing the edited object may be regenerated.

In general, any type of ink object may be recognized and edited using the ink editing system. For example, a chart may be recognized and editing operations may be performed on the recognized chart, including resizing containers, moving containers, reflowing connectors, and so forth. A list may also be recognized and editing operations may be performed on the recognized list, including resizing the list, reordering items in the list, and so forth. A table may also be recognized and editing operations may be performed on the recognized table, including resizing a row or column of cells, aligning contents within a cell to the right or left, and so forth.

Advantageously, the system and method are insensitive to stroke input order and the number of strokes that may form a hand-drawn ink object. Furthermore, the system and method may be used to recognize any type of hand-drawn ink object by providing an appropriate type of ink object recognizer. Once the type of ink object may be recognized, the ink object may be edited and the ink representing the edited ink object may be regenerated. Additional editing operations may be performed on the ink object or additional ink input may be received.

Other advantages will become apparent from the following detailed description when taken in conjunction with the drawings, in which:

BRIEF DESCRIPTION OF THE DRAWINGS

FIGS. 4A-4D are exemplary illustrations generally representing switching between inking mode for receiving ink input and editing mode for editing an ink object recognized, in accordance with an aspect of the present invention;

FIGS. 16A-16D are exemplary illustrations generally representing a menu of editing operations from a widget that may be performed on a recognized chart, in accordance with an aspect of the present invention;

FIGS. 21A-21B are exemplary illustrations generally representing reordering a list item in a recognized list, in accordance with an aspect of the present invention;

DETAILED DESCRIPTION

Exemplary Operating Environment

Figure 1:
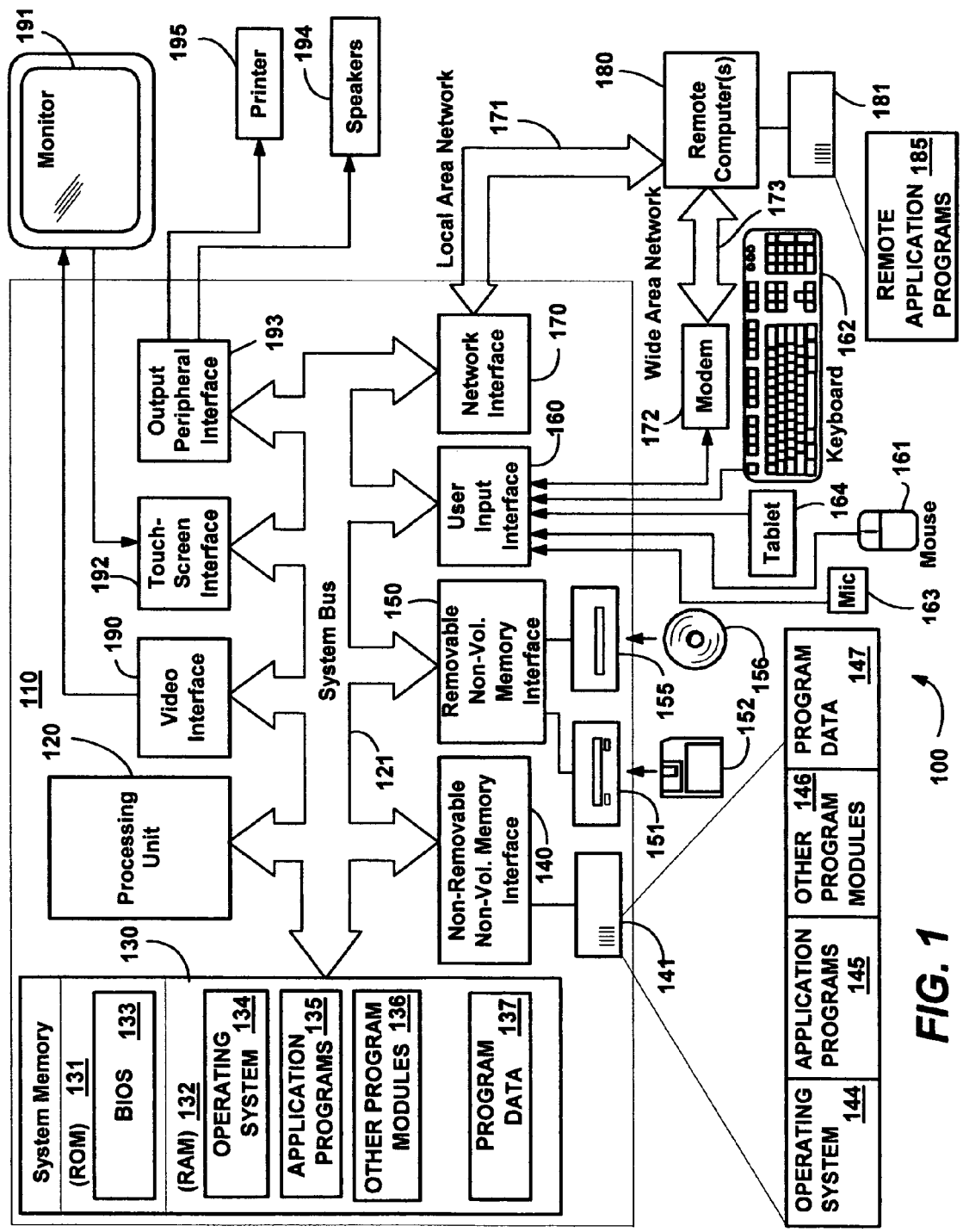
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Editing Ink Objects Recognized in Ink Input

The present invention is generally directed towards a system and method for editing ink objects recognized in ink input. As used herein, an ink object or drawing object may mean any handwritten non-character shape or drawing, including a hand-drawn chart, a list, a table, and so forth. A user may draw ink objects such as a diagram, chart, list, or table freely without restrictions on the hand-drawn input. An ink object may have many strokes and the input order of strokes may be arbitrary so that the system and method may accept any ink as input. As used herein, ink generally means a handwritten stroke or strokes. Moreover, the strokes could be over-traced or overlapped. For either case, the system and method may automatically detect the correct shapes of the drawing objects.

In one embodiment, the system and method may detect the hand-drawn shape of containers and connectors in ink input. As used herein, a container means any closed drawing object, and a connector means any drawing object joining containers. Then, shape recognition may be performed for each container and each connector detected within the ink input. And object recognition, such as chart recognition, list detection or table detection, may be performed for recognized shapes within the ink input.

As will be seen, an ink object may be recognized and then edited and the ink regenerated for each edited ink object. Various ink object editors may edit particular ink objects. For example, a chart editor may be used for editing a hand-drawn chart recognized by the ink parser, a list editor may be used for editing a hand-drawn list recognized by the ink parser, and a table editor may be used for editing a hand-drawn table recognized by the ink parser. As will be understood, the various block diagrams, flow charts and scenarios described herein are only examples, and there are many other scenarios to which the present invention will apply.

Figure 2:
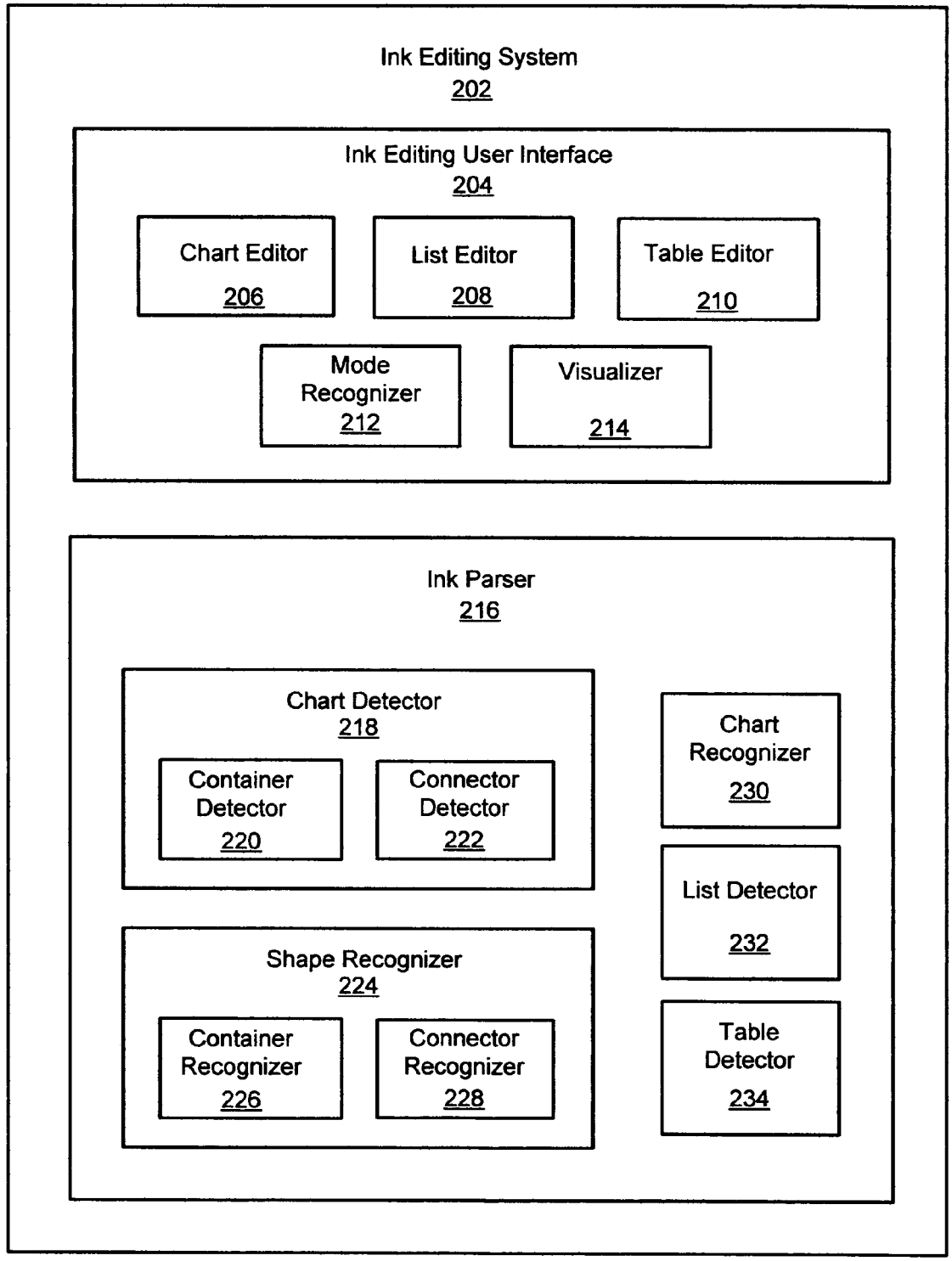
FIG. 2 is a block diagram generally representing an exemplary architecture of system components for editing an ink object recognized in ink input, in accordance with an aspect of the present invention.

Turning to FIG. 2 of the drawings, there is shown a block diagram generally representing an exemplary architecture of system components for editing an ink object recognized in ink input. Those skilled in the art will appreciate that the functionality implemented within the blocks illustrated in the diagram may be implemented as separate components or the functionality of several or all of the blocks may be implemented within a single component. For example, the functionality for the mode recognizer 212 may be included in the ink parser 216 or the functionality of the mode recognizer 212 may be implemented as a separate component.

The ink editing system 202 may include an ink editing user interface 204 operably coupled to an ink parser 216. The ink editing user interface 204 may edit ink objects recognized in ink input such as hand-drawn diagrams, charts, lists, tables and so forth. The ink editing user interface 204 may include an operably coupled chart editor 206 for editing recognized diagrams and charts, an operably coupled list editor 208 for editing recognized lists, an operably coupled table editor 210 for editing recognized tables, an operably coupled mode recognizer 212 for switching between drawing and editing modes, and an operably coupled visualizer 214 for providing a graph of the contents of a recognized table. These software components may be any type of executable software code, including an object or application linked library.

The ink parser 216 may accept any ink, including ink with a drawing object. The ink parser 216 may include an operably coupled chart detector 218, an operably coupled shape recognizer 224, an operably coupled chart recognizer 230, an operably coupled list detector 232, and an operably coupled table detector 234. In general, the chart detector 218, the shape recognizer 224, the chart recognizer 230, the list detector 232, and the table detector 234 may be any type of executable software code such as a kernel component, an application program, a linked library, an object, and so forth. The chart detector 218 may include an operably coupled container detector 220 and an operably coupled connector detector 222. In an embodiment, the container detector 220 may find the strokes that belong to a container and the connector detector 222 may find the strokes that belong to a connector as described in more detail in U.S. patent application Ser. No. 10/850,948 entitled "System And Method For Detecting a Hand-Drawn Object in Ink Input," assigned to the same assignee as the present invention. The shape recognizer 224 may include an operably coupled container recognizer 226 and an operably coupled connector recognizer 228. In an embodiment, the container recognizer 226 may be used to recognize closed containers and the connector recognizer 228 may be used to recognize unclosed connectors in a drawing such as a diagram or chart as described in more detail in U.S. patent application Ser. No. 10/850,718 entitled "System And Method For Shape Recognition of Hand-Drawn Objects," assigned to the same assignee as the present invention.

The chart recognizer 230 may recognize a diagram or chart in one embodiment from recognized containers and/or connectors as described in more detail in U.S. patent application Ser. No. 10/850,948 entitled "System And Method For Recognition of a Hand-Drawn Chart in Ink Input," assigned to the same assignee as the present invention. The list detector 232 may recognize the structure of a list in ink input in one embodiment as described in more detail in U.S. patent application Ser. No. 10/850,680 entitled "System And Method For Detecting A List in Ink Input," assigned to the same assignee as the present invention. And the table detector 234 may recognize the structure of a table in ink input from the containers recognized in ink input.

Figure 3:
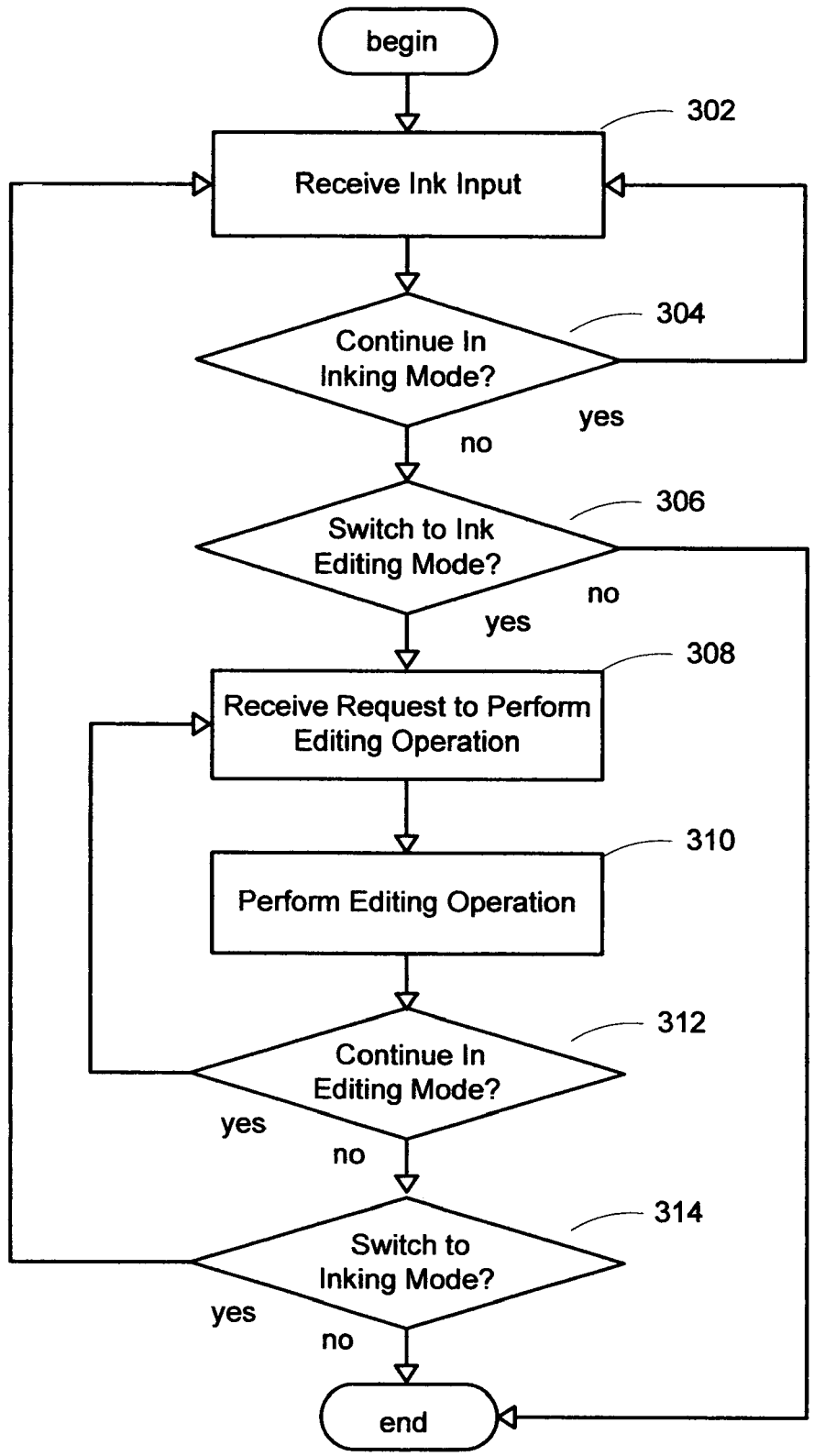
FIG. 3 is a flowchart generally representing the steps undertaken for switching between inking mode for receiving ink input and editing mode for editing ink input, in accordance with an aspect of the present invention.

FIG. 3 presents a flowchart generally representing the steps undertaken for switching between inking mode for receiving ink input and editing mode for editing ink input. At step 302, any ink input may be received, including ink with a drawing object. It may be determined at step 304 whether to continue in inking mode for receiving ink input. For example, it may be determined in an embodiment to continue in inking mode if there has not been any indication received for terminating the process for receiving ink input or if there has not been any indication received that the ink system mode should switch from inking mode for receiving ink input to ink editing mode for editing ink input. At step 306, it may be determined whether to switch to ink editing mode for editing ink input. If not, then processing may be finished. Otherwise, it may be determined to switch to ink editing mode for editing ink input.

There may be various embodiments for determining whether to switch to ink editing mode for editing ink input. For example, an indication may be generated in an embodiment for switching from ink input mode to ink editing mode after a period during which there has not been any ink input received. In various embodiments, an indication for switching from ink input mode to ink editing mode may be received from user input such as selecting "edit" from a menu or from mousing over an editing toolbar. In any of these embodiments, if it may be determined at step 306 to switch to editing mode for editing ink input, then a request to perform an editing operation may be received at step 308 and the editing operation may be performed at step 310. The editing operation may be any type of editing operation applicable to the drawing object in ink input. For example, the editing operation requested may be to resize a drawing object.

Upon performing the editing operation requested, it may be determined at step 312 whether to continue in editing mode. If so, then a request may be received at step 308 to perform an editing operation and processing may continue. Otherwise, it may then be determined at step 314 whether to switch to ink input mode for receiving ink input. If not, then processing may be finished. Otherwise, ink input may be received at step 302 and processing may continue.

Figures 4A, 4B, 4C, 4D:
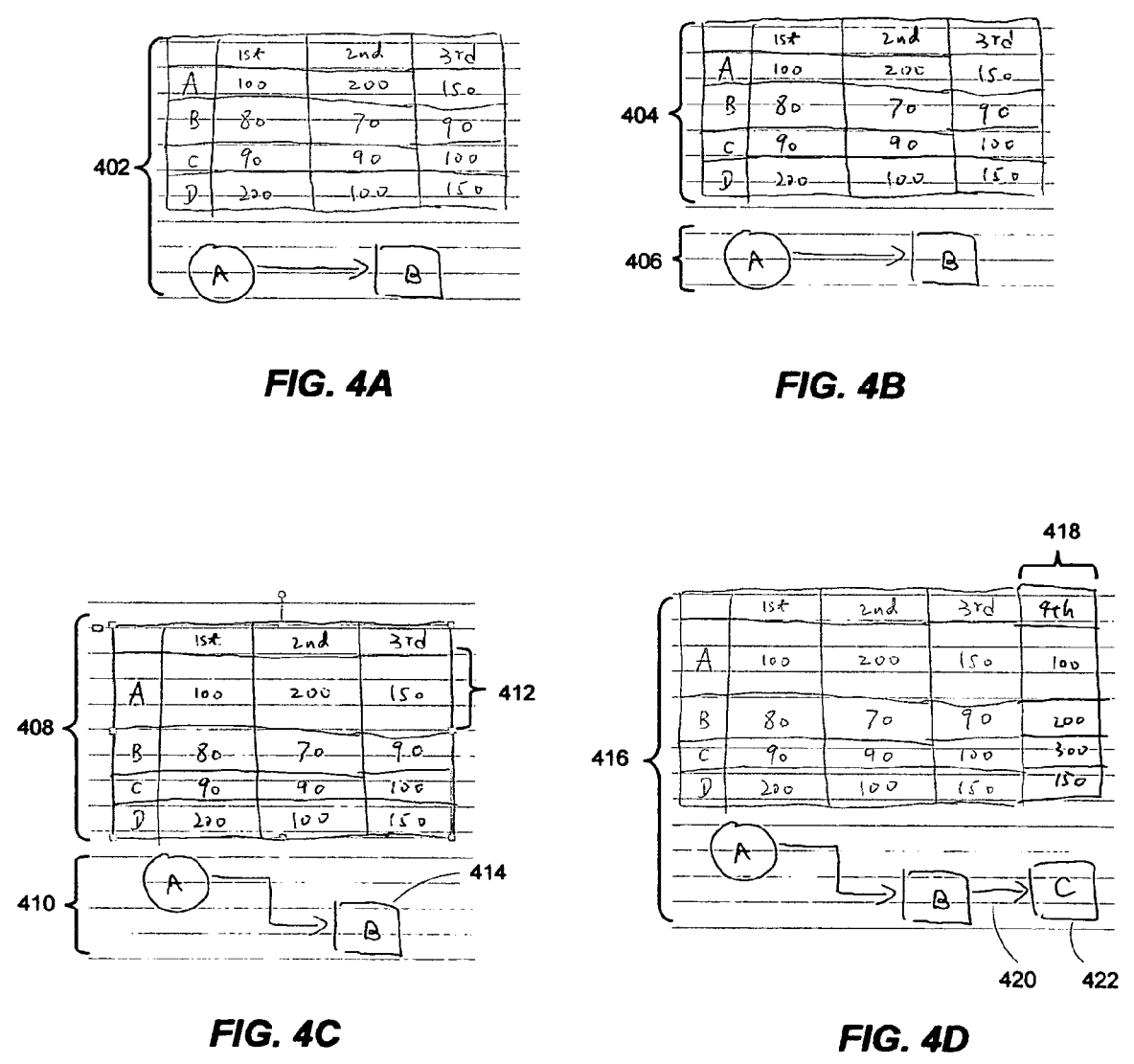

FIGS. 4A-4D provide exemplary illustrations generally representing switching between inking mode for receiving ink input and editing mode for editing an ink object recognized. For example, ink input 402 illustrated in FIG. 4A may be received while the system is in ink input mode. The system may then switch from ink input mode to ink editing mode. FIG. 4B illustrates table 404 which may be recognized as one ink object in the ink input and also illustrates chart 406 which may be recognized as another ink object in the ink input. In ink editing mode, the table and the chart may be edited. For example, table 408 illustrated in FIG. 4C may be edited by performing an editing operation to resize row 412 of table 408. And chart 410 illustrated in FIG. 4C may be edited by performing an editing operation to move container 414 in chart 410. The ink may be regenerated for the edited ink objects and the ink editing system may then switch to ink input mode for receiving additional ink input. For instance, ink input 416 illustrated in FIG. 4D may receive additional drawing strokes such as the drawing strokes 418 representing an additional row of a table, drawing strokes 420 representing an arrow, and drawing strokes 422 representing a container. The ink editing system may then switch from ink input mode to ink editing mode for editing the table with the added row as well as editing the chart with the additional connected container.

Figure 5:
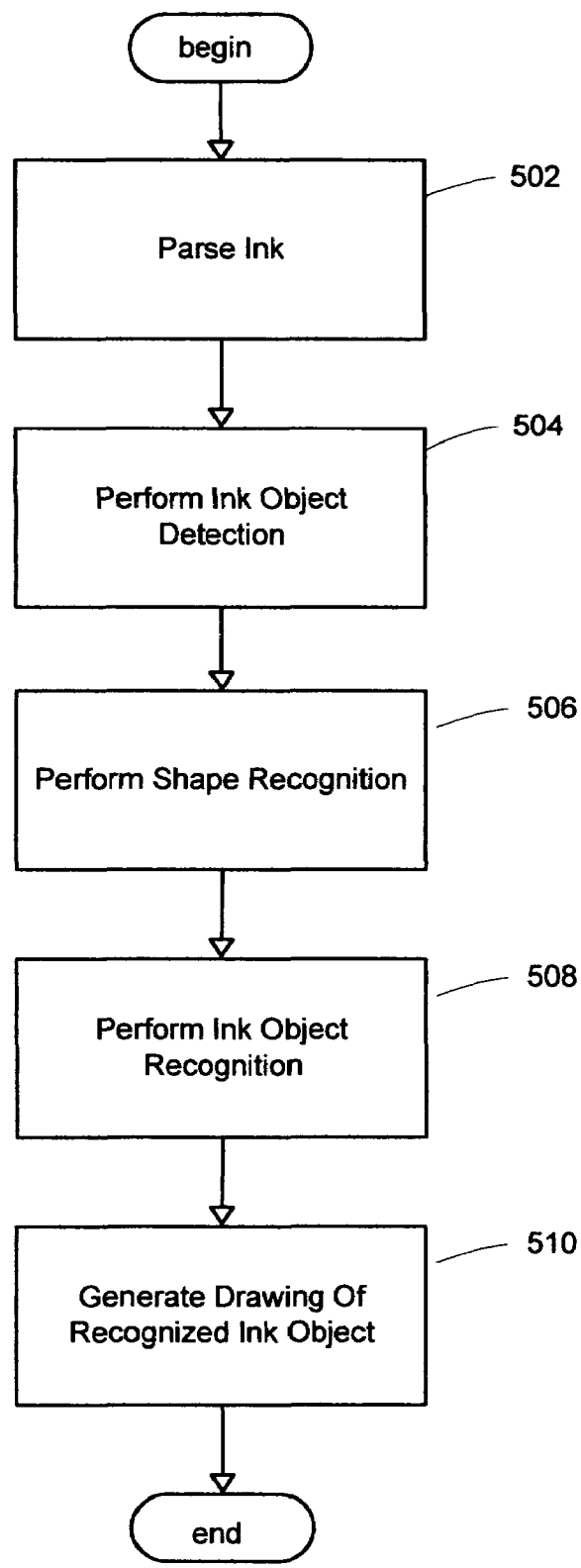
FIG. 5 is a flowchart generally representing the steps undertaken during inking mode for recognition of an ink object in ink input, in accordance with an aspect of the present invention.

FIG. 5 presents a flowchart generally representing the steps undertaken during inking mode for recognition of an ink object in ink input. At step 502, any ink may be parsed, including ink with a drawing object. For instance, in one embodiment, a page of ink may be accepted as input and parsed. In this embodiment, the ink parser, for example, may have no a priori knowledge of the ink on the page. Therefore, fundamental algorithms such as word grouping, writing/drawing classification and drawing grouping may be executed. In order to perform word grouping, strokes may be grouped into hierarchies of words, lines, and blocks. To do so, the word grouping process may include feature extraction of strokes to captures distance, geometric dissimilarity and linearity, and other stroke features. The word grouping process may also include dynamic programming to group the strokes according to temporal information. The word grouping process may also include clustering to group the strokes according to spatial information. The words, lines and blocks identified in the groups may not necessarily correspond to real semantic words, lines and blocks. In fact, these groups may include strokes of hand-drawn objects.

To perform writing/drawing classification, various features may be identified that may differentiate writing from drawing. For instance, single word features such as curvature, density, and other handwriting model features, may be used to differentiate writing from drawing. In one embodiment, context features such as temporal and spatial context features, may be used to differentiate writing from drawing. Each of the various features may be mapped to a fuzzy function, and classification between writing and drawing may be determined according to a combination of the fuzzy functions.

After performing word grouping and writing/drawing classification, the drawing strokes may be well organized by performing drawing grouping. To perform drawing grouping, the drawing strokes may be grouped into independent objects according to the spatial relationship among them. An efficient grid-based approach may be used for fitting the ink strokes into an image grid with an appropriate size. The image grid may be labeled to find connected components. Each connected component may correspond to a drawing object. Heuristic rules may then be applied to adjust the drawing objects.

At step 504, ink object detection may be performed to group drawing strokes by finding all the strokes that may belong to a drawing object. For example, a chart detector may detect charts in an embodiment as described in more detail in U.S. patent application Ser. No. 10/850,948 entitled "System And Method For Detecting a Hand-Drawn Object in Ink Input," assigned to the same assignee as the present invention. As another example, a list detector may detect lists in an embodiment as described in more detail in U.S. patent application Ser. No. 10/850,680 entitled "System And Method For Detecting A List in Ink Input," assigned to the same assignee as the present invention.

At step 506, shape recognition may be performed to recognize containers and connectors. After all of the strokes have been grouped for each container and each connector, the shape recognizer 224, in an embodiment, may be used to recognize closed containers and unclosed connectors in a drawing such as a diagram or chart as described in more detail in U.S. patent application Ser. No. 10/850,718 entitled "System And Method For Shape Recognition of Hand-Drawn Objects," assigned to the same assignee as the present invention. When recognized, the type, location, orientation and size of the shape can be provided. Advantageously, the order of stroke input and the number of strokes do not affect the recognition.

When shape recognition has been performed to recognize the shape of a drawing object, ink object recognition may be performed at step 508 to recognize the type of ink object. For example, chart recognition may be performed to recognize the type of diagram(s) and/or chart(s). List detection may be performed to recognize the structure of a list, including the relationship among the list items. Table detection may be performed to recognize the structure of a table. When ink object recognition has been performed to recognize the type of ink object, the drawing of the ink object may be generated at step 510.

Figure 6:
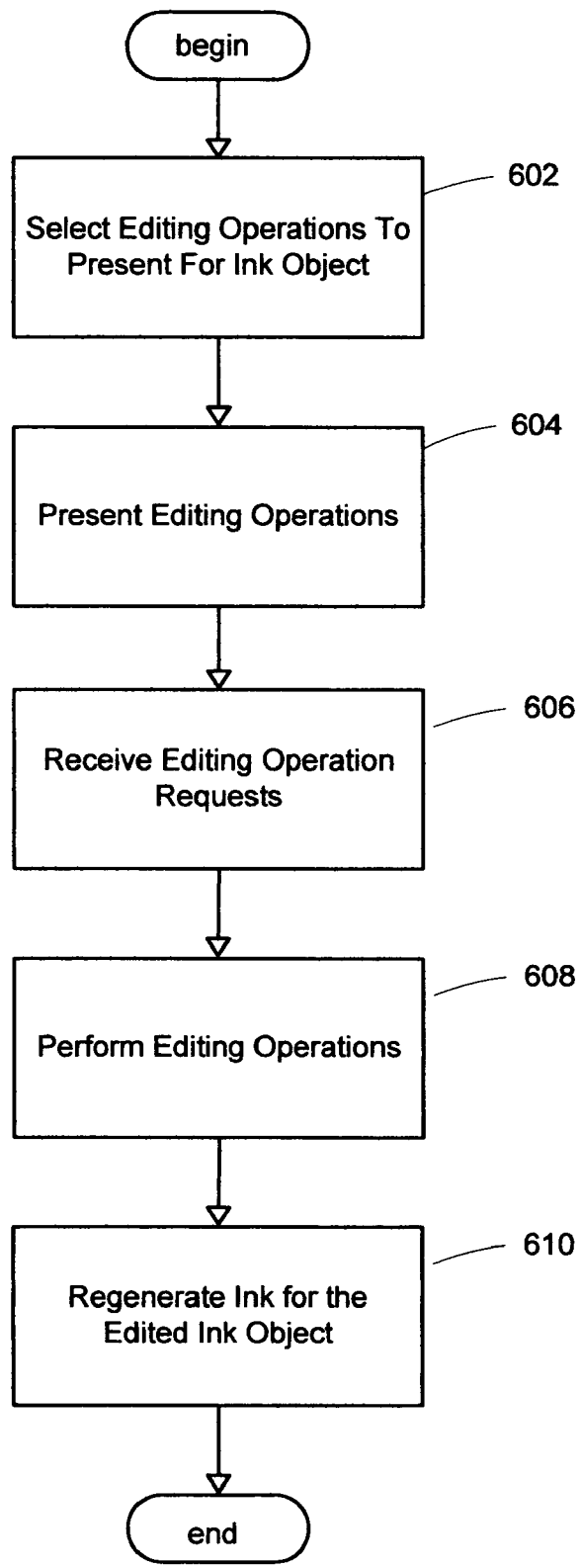
FIG. 6 is a flowchart generally representing the steps undertaken during ink editing mode in an embodiment for performing ink editing operations on an ink object recognized in ink input, in accordance with an aspect of the present invention.

FIG. 6 presents a flowchart generally representing the steps undertaken during ink editing mode in an embodiment for performing ink editing operations on an ink object recognized in ink input. At step 602, editing operations may be selected for presenting to a user for editing the ink object recognized. For example, an editing operation for a chart may be to move a container, an editing operation for a list may be to reorder items in the list, an editing operation for a table may be to resize a column of cells in the table.

Next the editing operations may be presented at step 604. In an embodiment, a bounding box may for instance be created around the ink object recognized and a widget menu for presenting the editing operations provided for the type of ink object. At step 606, a request to perform an editing operation may be received and the editing operation may be performed at step 608. The request may be made by selecting an editing operation, for instance, from a menu or by direct manipulation such as drag and drop. Finally, the ink may be regenerated at step 610 for the edited ink object.

Figure 7:
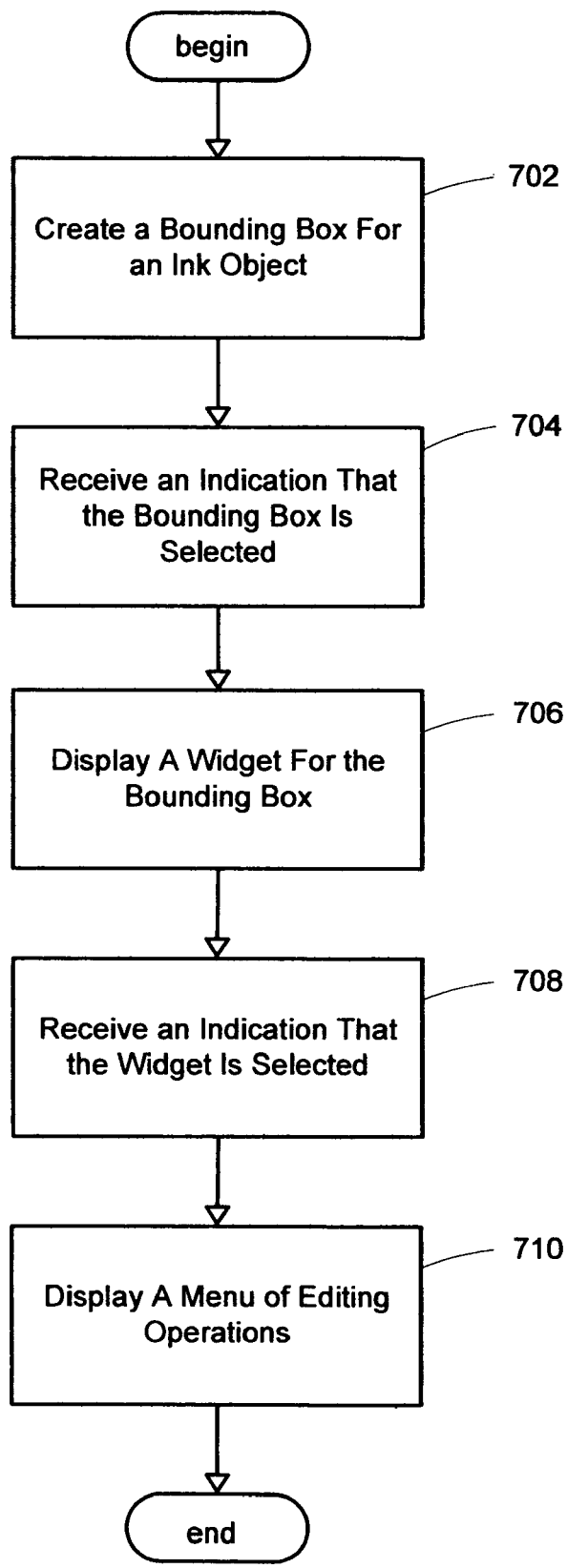
FIG. 7 is a flowchart generally representing the steps undertaken during ink editing mode in an embodiment for displaying a widget menu of editing operations for a recognized ink object, in accordance with an aspect of the present invention.

FIG. 7 presents a flowchart generally representing the steps undertaken during ink editing mode in an embodiment for displaying a widget menu of editing operations for a recognized ink object. The menu items presented may be different based upon the ink object recognized. For instance, the menu items for editing operations for a chart may be different than the menu items for editing operations for a list. In an embodiment, the menu of items may also present common operations including geometric transformations such as translation, rotation, and scaling that may be used, for instance, to resize or rotate a recognized ink object. These geometric transformations may be implemented by transforming the coordinates of the points of each stroke of the ink object recognized.

Figure 9A:
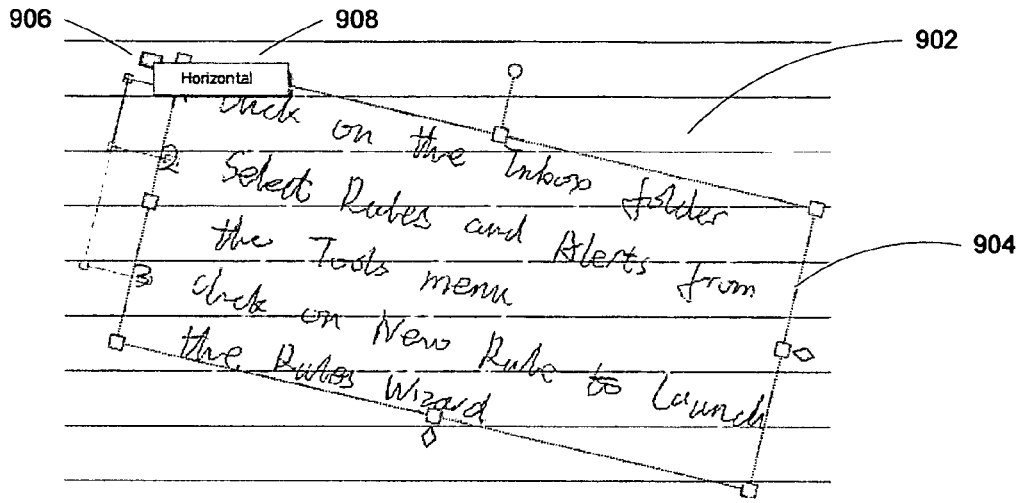
FIGS. 9A-C are exemplary illustrations generally representing an ink object recognized as a list which may be edited by using a widget menu or by direct manipulation, in accordance with an aspect of the present invention.

At step 702, a bounding box may be created for the ink object recognized. An indication that the bounding box may be selected may then be received at step 704. In an embodiment, an indication may be received that the bounding box may be selected when a user may select the bounding box using a mouse. A widget may be displayed at step 706 for the bounding box such as widget 906 displayed at the top left of the ink object as illustrated in FIG. 9A. An indication may be received that the widget may be selected at step 708. Then a menu of editing operations from the widget may be displayed at step 710 such as widget menu 908 displayed at the top left of the ink object as illustrated in FIG. 9A. The menu items presented may be different based upon the ink object recognized. For example, the widget menu for a chart may provide an editing operation to beautify the chart by normalizing the drawing strokes, an editing operation to rotate the chart by 90 degrees, or an editing operation to regularize the chart by changing common connectors of the chart to normal connectors. For a list, the widget menu may provide editing operations to rotate the list to be horizontal such as widget menu 908 displayed at the top left of the ink object as illustrated in FIG. 9A. And for a table, the widget menu may provide an editing operation to rotate the table to horizontal, or an editing operation to visualize the table contents with a chart, or editing operations to align the contents to left, right, top, bottom or center of the cells.

Figure 8:
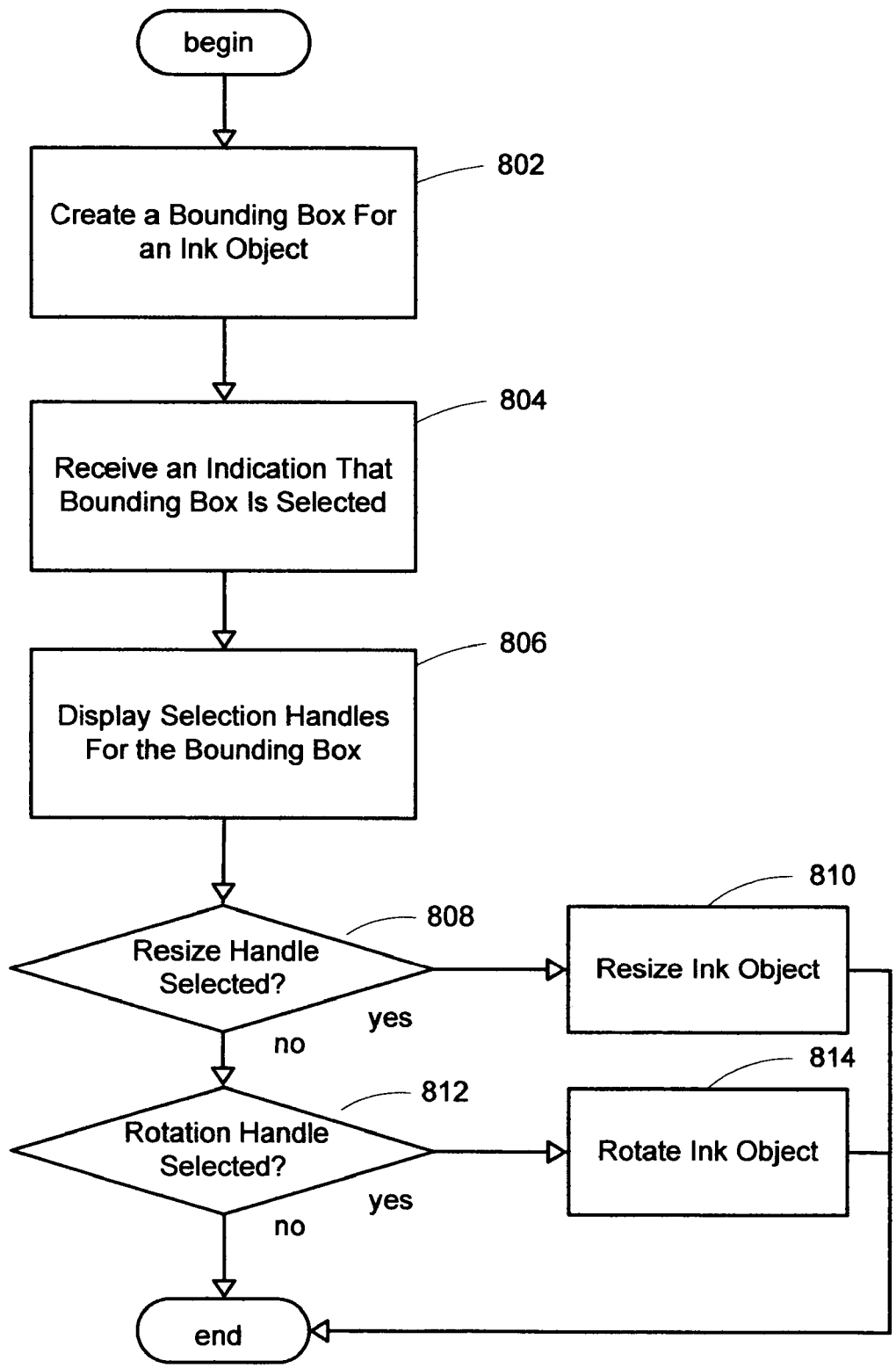
FIG. 8 is a flowchart generally representing one embodiment of the steps undertaken for performing editing operations upon a recognized ink object by direct manipulation of the ink object, in accordance with an aspect of the present invention.

FIG. 8 presents a flowchart generally representing one embodiment of the steps undertaken for performing editing operations upon a recognized ink object by direct manipulation of the ink object. At step 802 a bounding box may be created around the ink object recognized. An indication that the bounding box may be selected may then be received at step 804. For example, an indication may be received that the bounding box may be selected when a user may select the bounding box using a mouse. Selection handles may be displayed for the bounding box at step 806. In an embodiment, a selection handle with a circle at the end may be displayed for selection to rotate the ink object and a selection handle with a rectangle at the end may be displayed for selection to resize the ink object. For instance, a selection handle with a circle at the end that may be used for rotating a recognized ink object is illustrated as selection handle 914 in FIG. 9B. And a selection handle with a rectangle at the end that may be used for resizing a recognized ink object is illustrated as selection handle 916 in FIG. 9B.

Once selection handles may be displayed at step 806, it may be determined at step 808 whether the selection handle to resize a recognized ink object has been selected. If so, then the ink object may be resized at step 810. In an embodiment, the selection handle for resizing an ink object may be selected by placing the cursor controlled by a mouse over the selection handle for resizing an ink object and pressing the left button of the mouse. As the mouse may be moved while the left button is depressed, the ink object may be resized by transforming the coordinates of the points of each stroke of the ink object and scaling the strokes of the ink object according to the distance that the selection handle may be dragged by moving the mouse. After the ink object may be resized, then processing may be finished.

However, if it may be determined at step 808 that the selection handle to resize a recognized ink object has not been selected, then it may be determined at step 812 whether the selection handle to rotate a recognized ink object has been selected. If so, then the ink object may be rotated at step 814. In an embodiment, the selection handle for rotating an ink object may be selected by placing the cursor controlled by a mouse over the selection handle for rotating an ink object and pressing the left button of the mouse. As the mouse may be moved while the left button is depressed, the ink object may be rotated by transforming the coordinates of the points of each stroke of the ink object according to the angle of rotation that the selection handle may indicate by moving the mouse. After the ink object may be rotated, then processing may be finished.

Figure 9B:
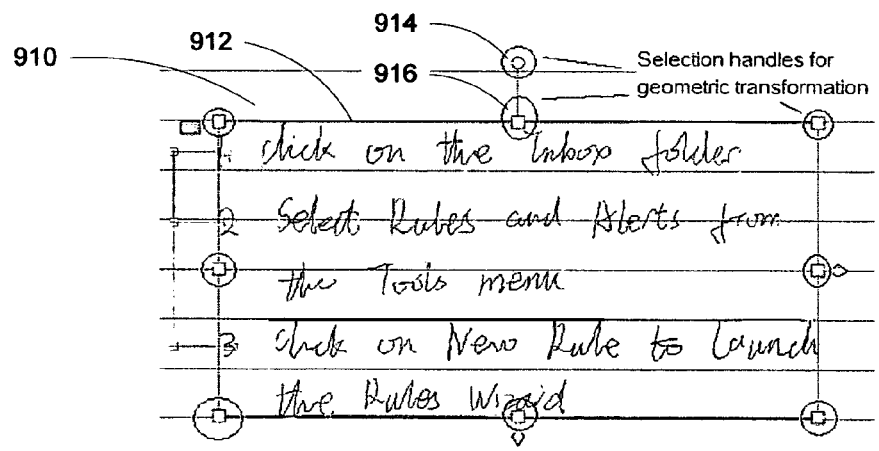
Figure 9C:
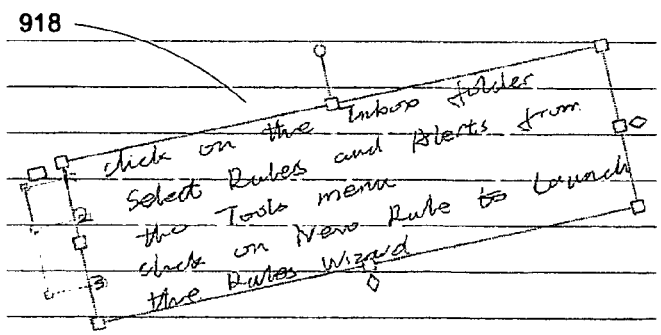

FIGS. 9A-9C provide exemplary illustrations generally representing an ink object recognized as a list which may be edited by using a widget menu or by direct manipulation of selection handles for performing geometric transformations. For example, an ink object may be recognized as a list, such as list 902 in FIG. 9A. In ink editing mode, list 902 may be surrounded by bounding box 904, and widget 906 may be displayed when the bounding box 904 may be selected by a user. Widget menu 908 may be subsequently displayed when widget 906 may be selected by a user. A menu item such as the horizontal editing operation displayed on the widget menu 908 may then be selected to rotate the list to be horizontal.

An ink object such as a list may also be edited by direct manipulation in an embodiment by using selection handles for performing geometric transformations. For instance, an ink object recognized as list 910 in FIG. 9B may have bounding box 912 created in ink editing mode to surround it. When bounding box 912 may be selected, such as by locating the cursor of a mouse over the bounding box 912 and clicking the left button of the mouse, selection handles may be displayed for performing drag and drop operations. For example, selection handle 914 illustrated with a circle in FIG. 9B may be selected to rotate the list 910. And selection handle 916 illustrated with a rectangle may be selected to resize the list. FIG. 9C illustrates list 918 after resizing and rotation of list 910 in FIG. 9B.

Figure 10:
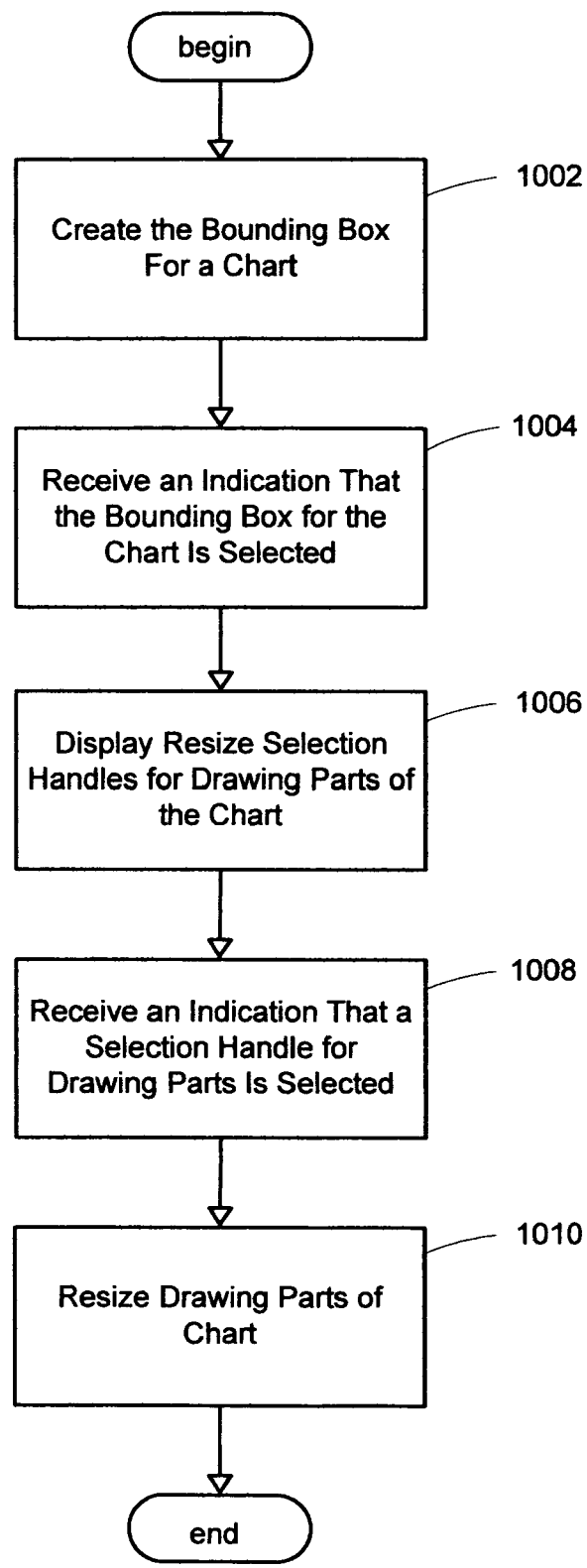
FIG. 10 is a flowchart generally representing one embodiment of the steps undertaken for resizing a recognized chart by direct manipulation of the ink object, in accordance with an aspect of the present invention.

FIG. 10 presents a flowchart generally representing one embodiment of the steps undertaken for resizing a recognized chart by direct manipulation of the ink object. At step 1002 a bounding box may be created around the recognized chart. An indication may then be received at step 1004 that the bounding box for the chart may be selected. For example, an indication may be received that the bounding box may be selected when a user may select the bounding box using a mouse. Selection handles for resizing drawing parts of the chart may be displayed for the bounding box at step 1006. In an embodiment, a selection handle with a rectangle at the end may be displayed for selection to resize the ink object. For instance, a selection handle with a rectangle at the end that may be used for resizing a recognized chart is illustrated as selection handle 1106 in FIG. 11A.

Once selection handles may be displayed at step 1006, an indication may be received at step 1008 that the selection handle to resize a chart may be selected. The drawing parts of the recognized chart may then be resized at step 1010. The drawing parts of the chart may include connectors and borders of containers. The containers' contents may remain the original size and have the same relative positions to the centers of the corresponding containers as before resizing. In an embodiment, the selection handle for resizing a chart may be selected by placing the cursor controlled by a mouse over the selection handle for resizing the chart and pressing the left button of the mouse. As the mouse may be moved while the left button is depressed, the chart may be resized by transforming the coordinates of the points of each stroke of the chart and scaling the strokes of the chart according to the distance that the selection handle may be dragged by moving the mouse. After the chart may be resized, then processing may be finished.

In an embodiment, a container of a chart may similarly be resized. To do so, a bounding box may also be created around a container in a chart and selection handles for resizing the container may be displayed when the bounding box surrounding the container may be selected. The container may then be resized by dragging the selection handle for resizing the container using a mouse.

Figure 11A:
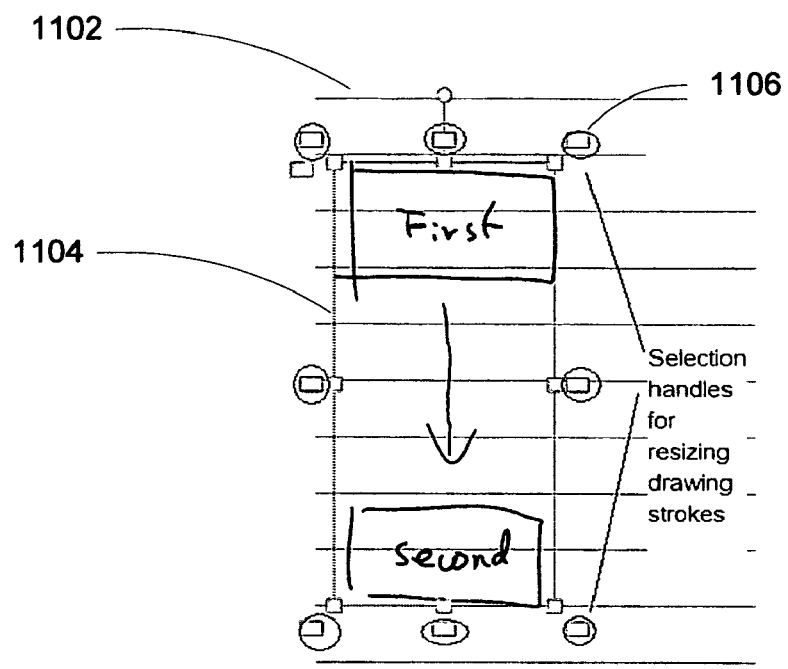
FIGS. 11A-11B are exemplary illustrations generally representing resizing the drawing parts of a recognized chart by using selection handles, in accordance with an aspect of the present invention.
Figure 11B:
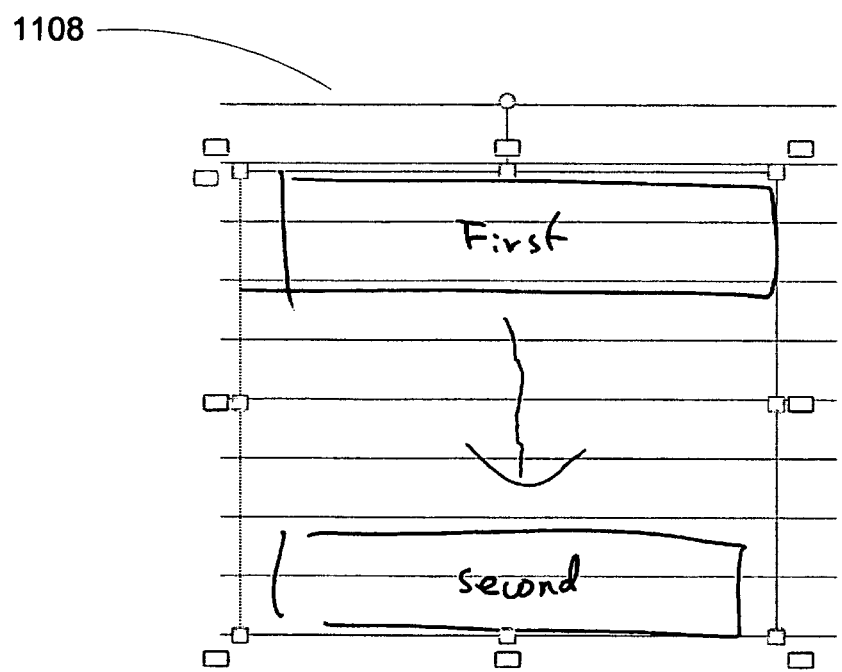

FIGS. 11A-11B provide exemplary illustrations generally representing resizing the drawing parts of a recognized chart by using selection handles. For example, recognized chart 1102 may be surrounded by bounding box 1104. When bounding box 1102 may be selected, selection handles may be displayed for performing drag and drop operations. For instance, selection handle 1106 illustrated with a rectangle may be selected to resize the chart. FIG. 11B illustrates chart 1108 after resizing the drawing parts of chart 1102 in FIG. 11A.

Figure 12:
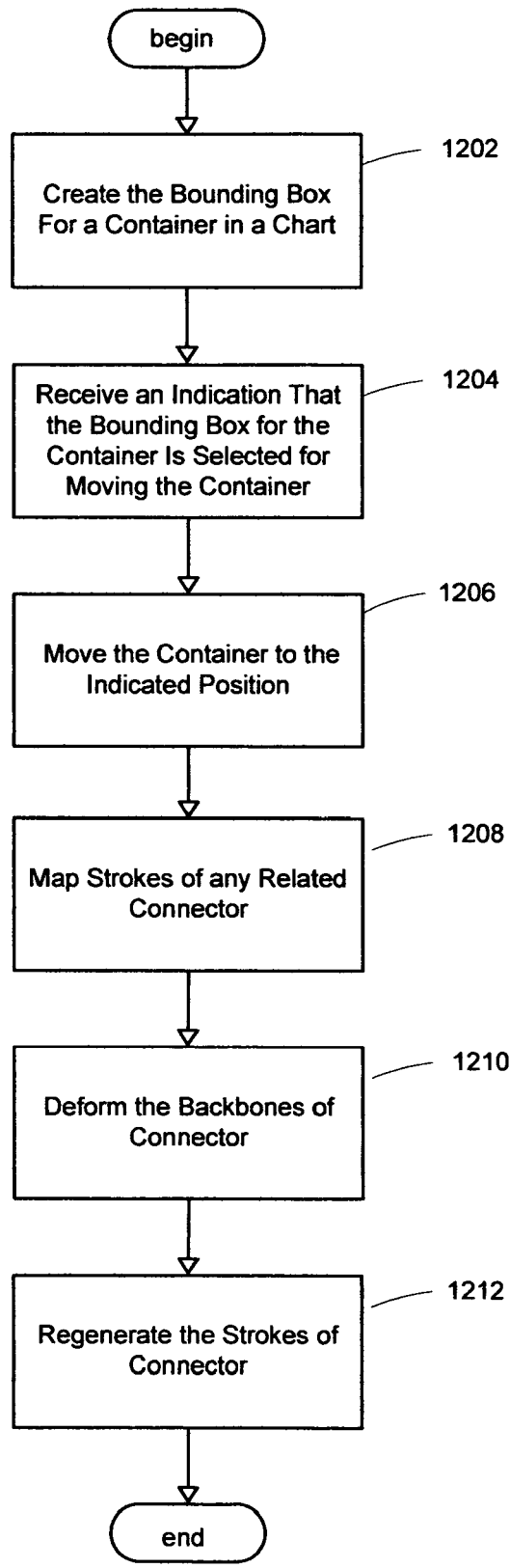
FIG. 12 is a flowchart generally representing one embodiment of the steps undertaken for moving a container in a recognized chart and performing connector reflow, in accordance with an aspect of the present invention.

FIG. 12 presents a flowchart generally representing one embodiment of the steps undertaken for moving a container in a recognized chart and performing connector reflow. Connector reflow, as used herein, may mean redrawing a connector between containers where at least one of the containers has been moved during an editing operation. At step 1202 a bounding box may be created around a container in a recognized chart. An indication may then be received at step 1204 that the bounding box for the container may be selected for moving the container. For example, an indication may be received that the bounding box may be selected when a user may select the bounding box using a mouse. The container may then be moved to the indicated position at step 1206, for instance by performing a drag and drop operation. Next, the strokes of any related connector may be mapped at step 1208. For each point of the strokes of the connector for example, the nearest line segment in the backbones may be computed and the point may be represented with the relative position on the line segment. For point P and line segment $\vec{AB}$, the relative position may be defined in an embodiment to be (d, p), where $d = |\vec{AP} \times \vec{AB}|/|\vec{AB}|$ and $p = \vec{AP} \cdot \vec{AB}/|\vec{AB}|^2$.

After the strokes of any related connector may be mapped at step 1208, the backbones of the connector may then be deformed at step 1210. In an embodiment, the ink parser may provide the normalized shapes of connectors as described in more detail in U.S. patent application Ser. No. 10/850,718 entitled "System And Method For Shape Recognition of Hand-Drawn Objects," assigned to the same assignee as the present invention. The normalized shapes of the connectors may be considered to be the backbones of the corresponding connectors. The nearest points of a connector's backbones to each linked container may be defined to be the joint points to the containers.

Once the backbones of the connector may be deformed, then the strokes of the connector may be regenerated at step 1212. For instance, the strokes may be regenerated based on the mapping of the strokes at step 1208 and new backbones. For each point of the strokes, for example, two equations may be generated from the mapping in step 1208 and the coordinate of the point may be computed by solving the equation set.

Figure 13A:
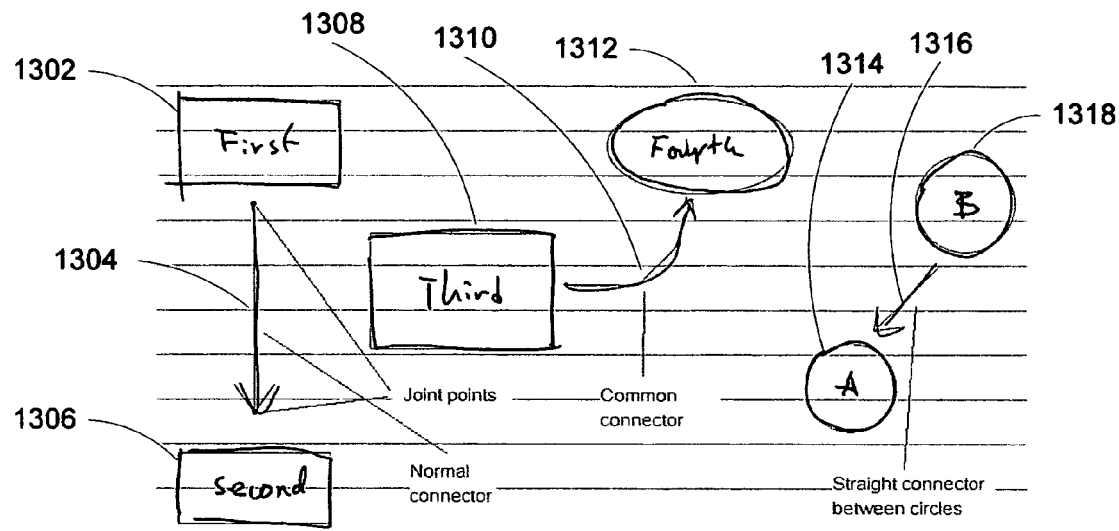
FIGS. 13A-13B are exemplary illustrations generally representing the types of connectors that may appear in a chart and exemplary connector reflow for these types of connectors when a linked container may be moved, in accordance with an aspect of the present invention.
Figure 13B:
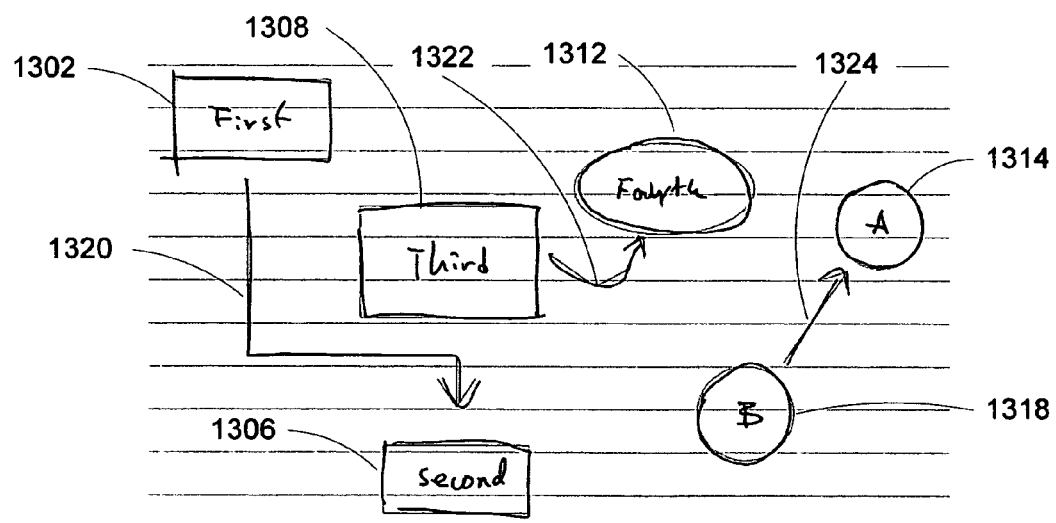

There may be different types of connectors to be considered when deforming the backbones of a connector at step 1210. There may be normal connectors, straight connectors, and common connectors. For instance, FIGS. 13A-13B provide exemplary illustrations generally representing the types of connectors that may appear in a chart and exemplary connector reflow for these types of connectors when a linked container may be moved. FIG. 13A illustrates a normal connector 1304 linking containers 1302 and 1306. A normal connector may be defined to have backbones that may be vertical and/or horizontal lines except for the arrow polylines. FIG. 13A also illustrates a straight connector 1316 linking containers 1314 and 1318. A straight connector may be defined to have backbone that may be only one straight line except for the arrow polylines, and the two linked containers connected by a straight connector may be circles or ellipses. And FIG. 13A illustrates a common connector 1310 linking containers 1308 and 1312. A common connector may be defined to be any connector that may not be a normal connector or a straight connector.

The three types of connectors may reflow in different ways when a linked container may be moved. When container 1306 of FIG. 13A may be moved to the position illustrated in FIG. 13B, normal connector 1304 may reflow as illustrated by connector 1320 in FIG. 13B. And when container 1312 of FIG. 13A may be moved to the position illustrated in FIG. 13B, common connector 1310 may reflow as illustrated by connector 1322 in FIG. 13B. Finally, when containers 1314 and 1318 of FIG. 13A may be moved to the positions illustrated in FIG. 13B, straight connector 1316 may reflow as illustrated by connector 1324 in FIG. 13B.

Figure 14:
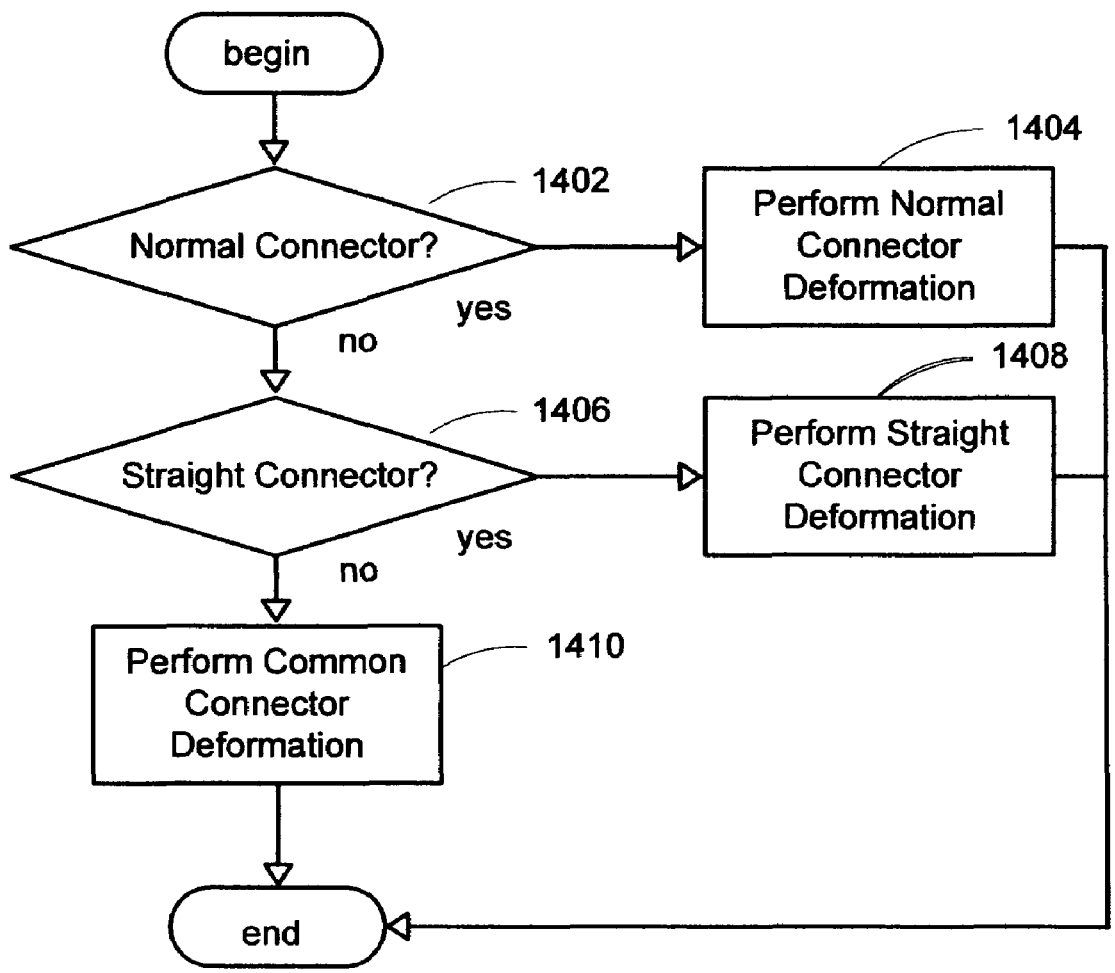
FIG. 14 is a flowchart generally representing one embodiment of the steps undertaken for deforming the backbones of a connector, in accordance with an aspect of the present invention.

FIG. 14 presents a flowchart generally representing one embodiment of the steps undertaken for deforming the backbones of a connector. At step 1402, it may be determined whether the connector may be a normal connector. If so, then normal connector deformation may be performed at step

1404. In an embodiment, the relative positions between the joint points and the containers may remain unchanged. For example, if A may be a joint point and M may be the center of the container linked to the joint point, then vector $\overrightarrow{AM}$ remains unchanged after moving the container. If A and B may be the start and end point of a backbone, the line segments between them may be either horizontal or vertical after reflowing the connector. The new backbone in the connector may then be generated by calculating the minimal Manhattan distance (city block distance) between A and B.

Figure 15:
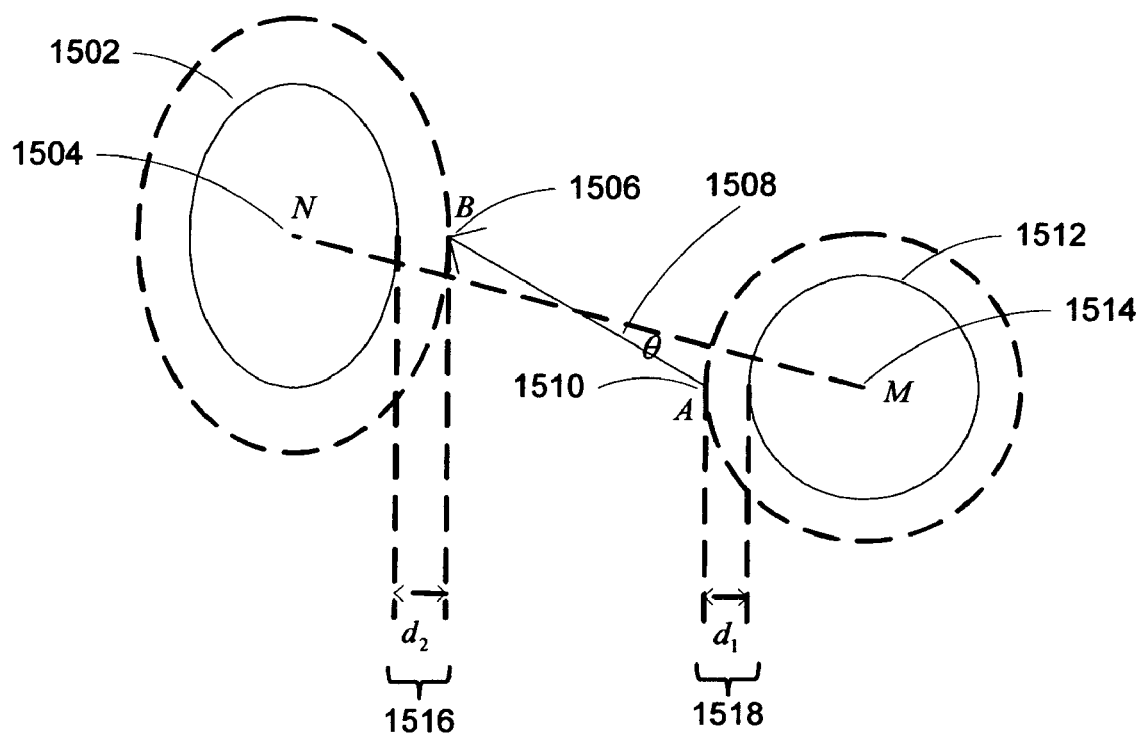
FIG. 15 is an exemplary illustration generally representing straight connector deformation for reflowing the connector between circles/ellipses, in accordance with an aspect of the present invention.

If it may be determined that the connector may not be a normal connector at step 1402, then it may be determined at step 1406 whether the connector may be a straight connector. If so, then straight connector deformation may be performed at step 1408. As illustrated in FIG. 15, $(d_1, d_2, \theta)$ remain unchanged in an embodiment after reflowing the connector for backbone $\overrightarrow{AB}$ and the corresponding two containers with center M and N, where $\theta$ may be the angle between $\overrightarrow{AB}$ and $\overrightarrow{MN}$, $d_1$ and $d_2$ may be the distances each endpoints of $\overrightarrow{AB}$ and the corresponding containers' normalized shapes. FIG. 15 provides an exemplary illustration generally representing straight connector deformation for reflowing the connector between circles/ellipses. FIG. 15 illustrates an ellipse 1502 with center N 1504 linked by a straight connector to a circle 1512 with center M 1514. The backbone of the connector has start point A 1510 and end point B 1506. The distance between start point A 1510 of the backbone and the normalized shape of circle 1512 is illustrated as $d_1$ 1518. And the distance between end point B 1506 of the backbone and the normalized shape of ellipse 1502 is illustrated as $d_2$ 1516. The angle $\theta$ 1508 is illustrated as the angle between $\overrightarrow{AB}$ and $\overrightarrow{MN}$. After reflowing the straight connector, $d_1$, $d_2$, and $\theta$ may be the same as they were before any container was moved.

If it may be determined that the connector may not be a straight connector at step 1406, then common connector deformation may be performed at step 1410. In an embodiment, the relative positions between the joint points and the containers may remain unchanged after connector reflow. For example, if A and B may be the start and end point of the backbone, then for any other point P of the backbone, the angle between $\overrightarrow{AP}$ and $\overrightarrow{AB}$ and $\overrightarrow{AP}-\overrightarrow{AB}/|\overrightarrow{AP}-\overrightarrow{AB}|$ may remain unchanged after connector reflow.

Additional editing operations may also be performed for a chart. In an embodiment, a menu of editing operations from a widget may be displayed for a chart. FIGS. 16A-D may present exemplary illustrations generally representing a menu of editing operations from a widget that may be performed on a recognized chart. FIG. 16A illustrates chart 1602 with widget menu 1604 displaying editing operations such as beautify, rotate 90 degrees and regularize. The editing operation to beautify is highlighted in FIG. 16A. When selected, this editing operation may beautify a chart by normalizing the drawing strokes of the chart, including containers 1606 and 1610 linked by connector 1608. FIG. 16B illustrates chart 1602 after the editing operation to beautify the chart has been performed. The edges of containers 1606 and 1610 have been straightened to form straight lines and the polylines forming the backbone and arrows of connector 1608 have also been straightened.

FIG. 16C illustrates chart 1612 with widget menu 1614 displaying the editing operation to regularize as highlighted. When selected, this editing operation may regularize the chart by changing common connectors of the chart to normal connectors. For example, common connector 1618 linking containers 1616 and 1620 in FIG. 16C may be changed to a normal connector by reflowing the connector so that the line segments between the start and end point of a backbone may be either horizontal or vertical after reflowing the connector. FIG. 16D illustrates chart 1612 after the editing operation to regularize the chart has been performed. The line segments between the start and end point of the backbones are now either horizontal or vertical after reflowing the connector 1618 in FIG. 16D.

Figure 17:
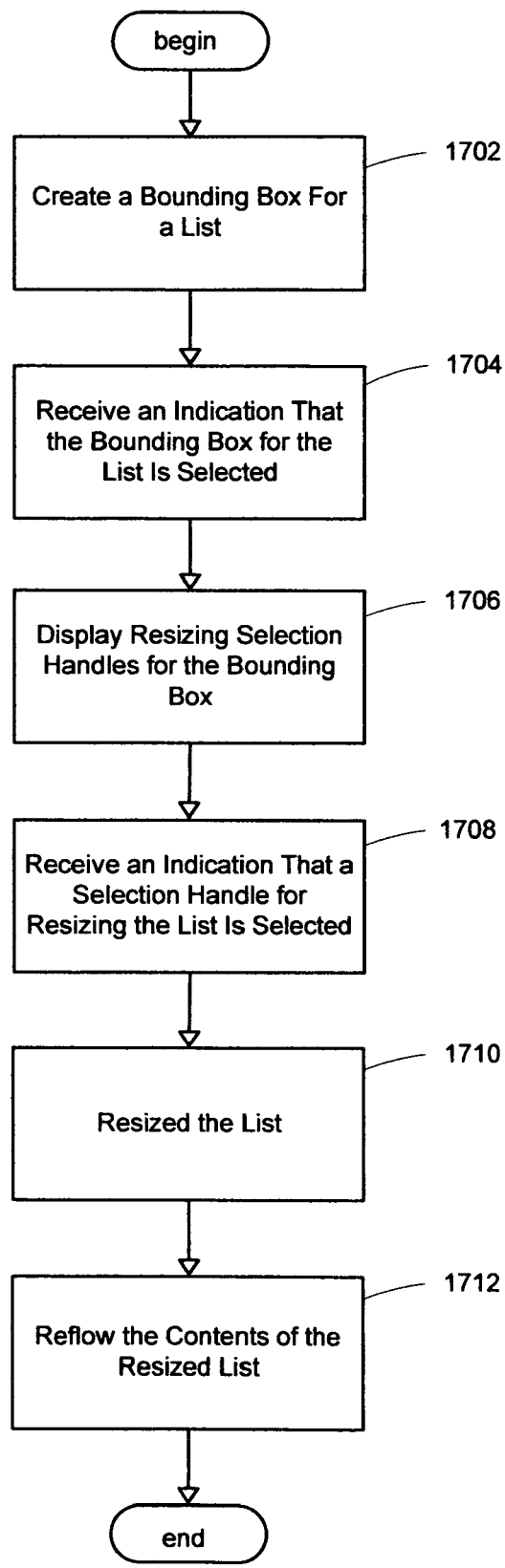
FIG. 17 is a flowchart generally representing one embodiment of the steps undertaken for resizing a recognized list by direct manipulation of the ink object, in accordance with an aspect of the present invention.

FIG. 17 presents a flowchart generally representing one embodiment of the steps undertaken for resizing a recognized list by direct manipulation of the ink object. At step 1702 a bounding box may be created around the recognized list. An indication may then be received at step 1704 that the bounding box for the list may be selected. For example, an indication may be received that the bounding box may be selected when a user may select the bounding box using a mouse. Selection handles for resizing the list may be displayed for the bounding box at step 1706. In an embodiment, a selection handle with a diamond at the end may be displayed for selection to resize the ink object. For instance, a selection handle with a diamond at the end that may be used for resizing a recognized list is illustrated as selection handle 1806 in FIG. 18A.

Once selection handles may be displayed at step 1706, an indication may be received at step 1708 that the selection handle to resize a list may be selected. The list may then be resized at step 1710. In an embodiment, the selection handle for resizing a list may be selected by placing the cursor controlled by a mouse over the selection handle for resizing the list and pressing the left button of the mouse. As the mouse may be moved while the left button is depressed, the list may be resized by transforming the coordinates of the points of each stroke of the list and scaling the strokes of the list according to the distance that the selection handle may be dragged by moving the mouse. At step 1712, the contents of the list may be reflowed within the resized list. After reflowing the contents of the resized list, processing may be finished.

Figure 18A:
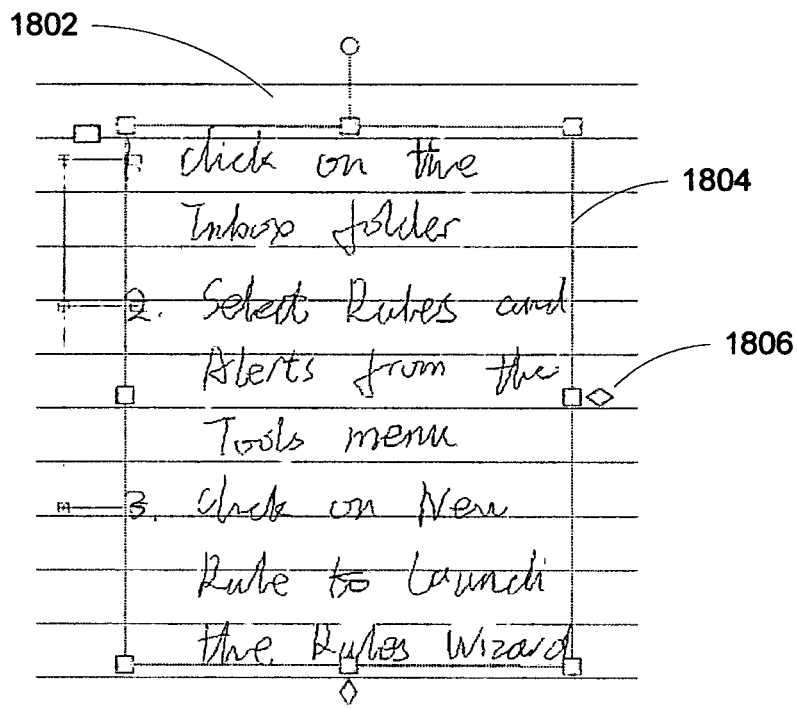
FIGS. 18A-18B are exemplary illustrations generally representing resizing a recognized list by using selection handles and reflowing content within the resized list, in accordance with an aspect of the present invention.
Figure 18B:
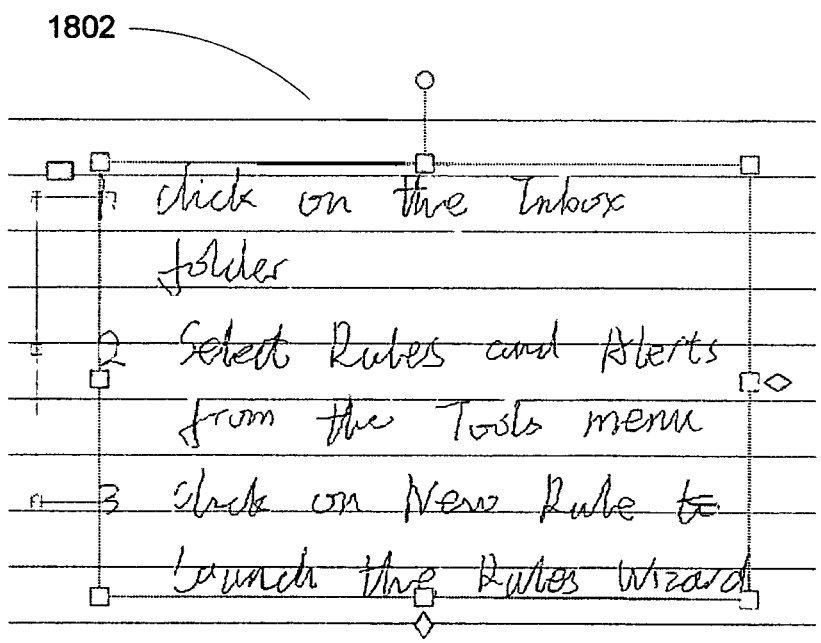

FIGS. 18A-18B provide exemplary illustrations generally representing resizing of a recognized list by using selection handles and reflowing content within the resized list. For example, recognized list 1802 may be surrounded by bounding box 1804. When bounding box 1804 may be selected, selection handles may be displayed for performing drag and drop operations. For instance, selection handle 1806 illustrated with a diamond may be selected to resize the list and reflow content within the resized list. A list can be reflowed in a horizontal direction or a vertical direction. FIG. 18B illustrates the list 1802 after resizing the list 1802 in FIG. 18A and reflowing the contents within the resized list in a horizontal direction. As may be observed, the word 'Inbox' in the second line of the first list item is moved to the first line after content reflow of the list resized in a horizontal direction.

Figure 19:
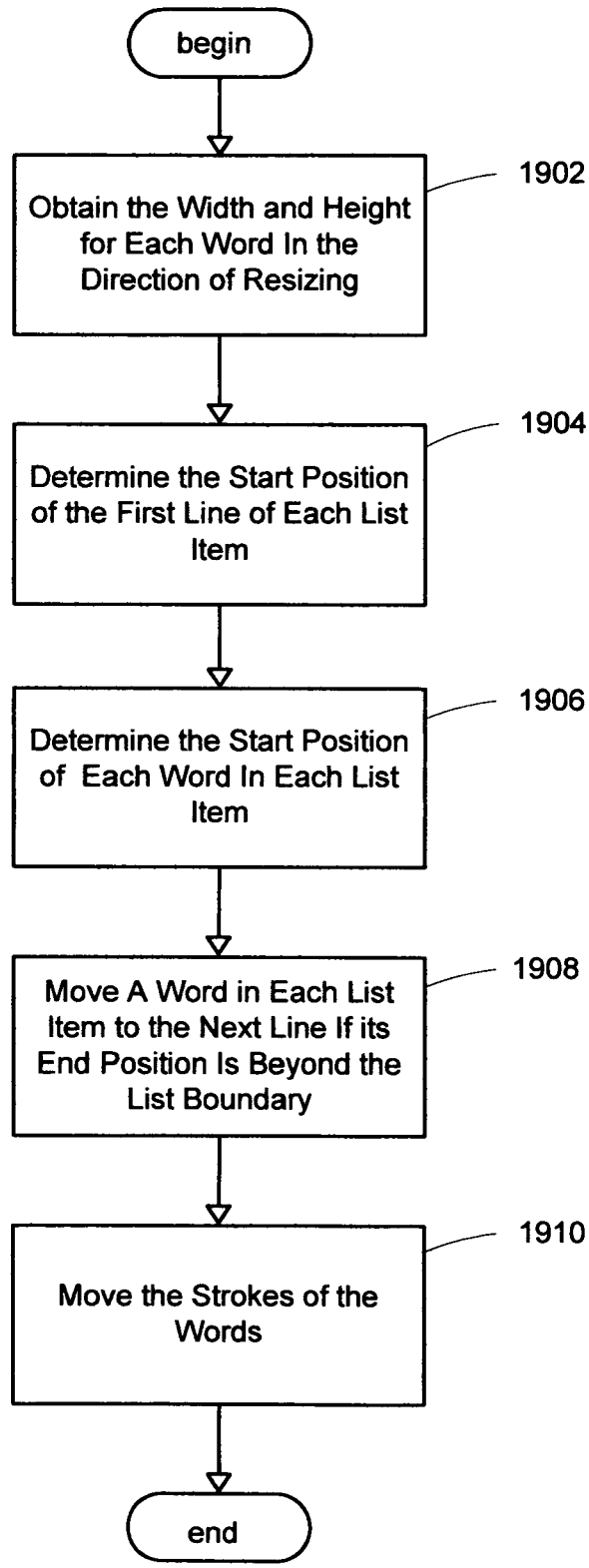
FIG. 19 is a flowchart generally representing one embodiment of the steps undertaken for reflowing content of a resized list, in accordance with an aspect of the present invention.

FIG. 19 presents a flowchart generally representing one embodiment of the steps undertaken for reflowing content of a resized list. At step 1902, the width and height may be obtained for each word in the direction of resizing. In an embodiment, a list may be resized in a horizontal direction or in a vertical direction. Then the start position of the first line of each list item may be determined at step 1904. In an embodiment for example, the x coordinate of the start position may be the x coordinate of the first word in a list item. The y coordinate of the start position may be the y coordinate of the last line of the prior list item plus the vertical distance between these two list items. The x coordinate of the start position of a bullet of a list item may not change in an embodiment and the y coordinate of the start position of the bullet may be the same as the y coordinate of the start position of the first line of the list item.

Next, the start position of each word in each line of a list item may be determined at step 1906. In an embodiment, the x coordinate of the start position of a word may be the end position of the prior word plus the horizontal distance between these two words. The y coordinate of the start position of a word may be the same as the y coordinate of the start position of the words in the current line of a list item.

After the start position of each word in each line of a list item may be determined at step 1906, a word in each list item may be moved at step 1908 to the next line if its end position is beyond the list boundary. In an embodiment, the x coordinate of the start position of a word moved to the next line may be set to be the same as the x coordinate of the start position of the first word in this list item. The y coordinate of the start position of the word moved to the next line may be set as the y coordinate of the start position of the words in the prior line plus the height of the prior line plus the vertical distance between these two lines. Finally, the strokes of the words in each list item may be moved at step 1910 and processing may be finished. In an embodiment, the strokes of the words may be moved according to the offset between the old start position and the new start position of each word.

Figure 20:
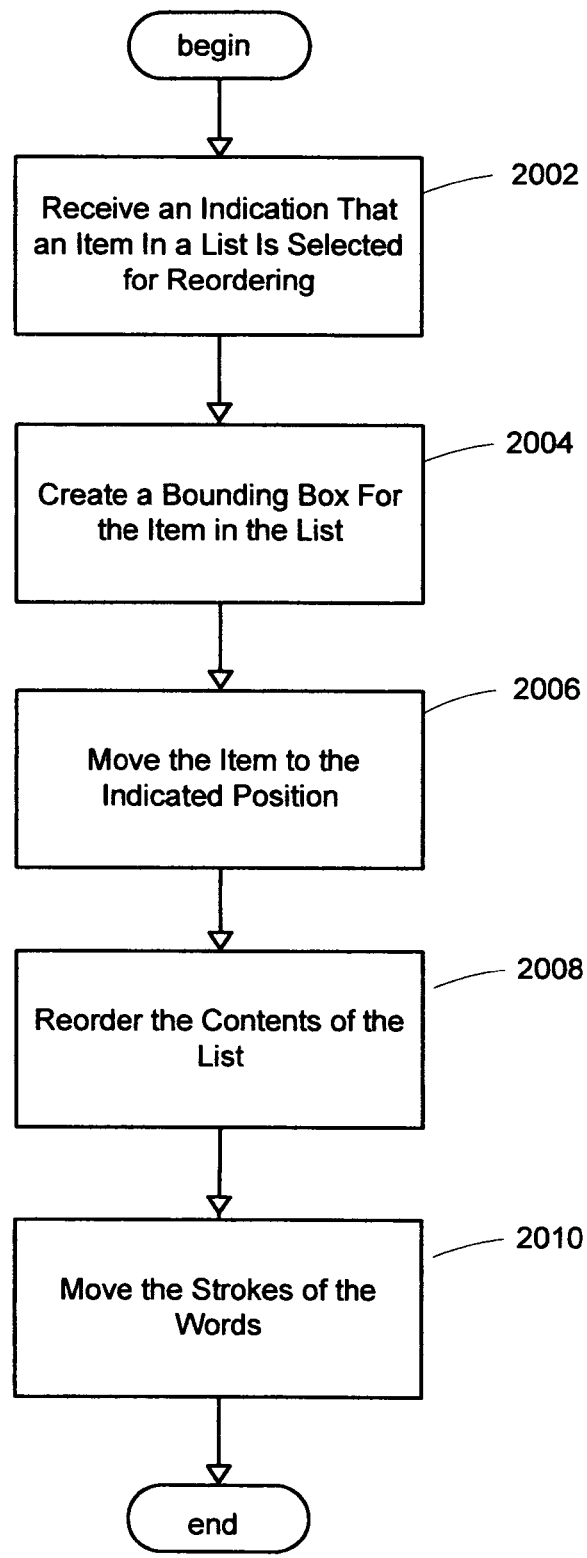
FIG. 20 is a flowchart generally representing one embodiment of the steps undertaken for reordering a list item in a recognized list by direct manipulation of the ink object, in accordance with an aspect of the present invention.

FIG. 20 presents a flowchart generally representing one embodiment of the steps undertaken for reordering a list item in a recognized list by direct manipulation of the ink object. At step 2002, an indication may be received that an item in a recognized list may be selected for moving its position in the list. For example, an indication may be received that an item in a recognized list may be selected for moving position in the list when the cursor of a mouse may be located over a bullet of a list item and the left button of the mouse may be clicked. At step 2004 a bounding box may be created around the item in the list. In an embodiment, the dash-line rectangle may be displayed as the bounding box of the list item.

The item in the list may be moved to the indicated position at step 2006. In an embodiment, the item may be dragged using a drag and drop operation and the size of the dash-line rectangle may be the same as the bounding box of the dragged list item. As the mouse may be moved, the dash-line rectangle may be moved with the same offset as that of the mouse position. When the dash-line rectangle may be dropped, for instance by the mouse button being released, the new position of the list item may be determined in relation to neighboring list items. For example, if the top of the dash-line rectangle may be above the top of the bound rectangle of a neighboring list item, the dragged list item may be positioned before this neighboring list item. If the top of the dash-line rectangle may be below the top of the bound rectangle of a neighboring list item, then the dragged list item may be positioned after this neighboring list item.

Once the item in the list may be moved to the indicated position at step 2006, the contents of the items in the list may then be reordered at step 2008. In an embodiment, the words in the dragged list item and the old list item in that position may be substituted. Finally, the strokes of the words of the items in the list may be moved at step 2010. In an embodiment, the offset of the strokes of the list items from top to bottom may be determined and the strokes of the words may be moved to the new position. Thus the contents of the list may be reordered while the bullets remain correctly ordered. After moving the strokes of the words of the items in the list at step 2010, processing may be finished.

Figures 21A, 21B:
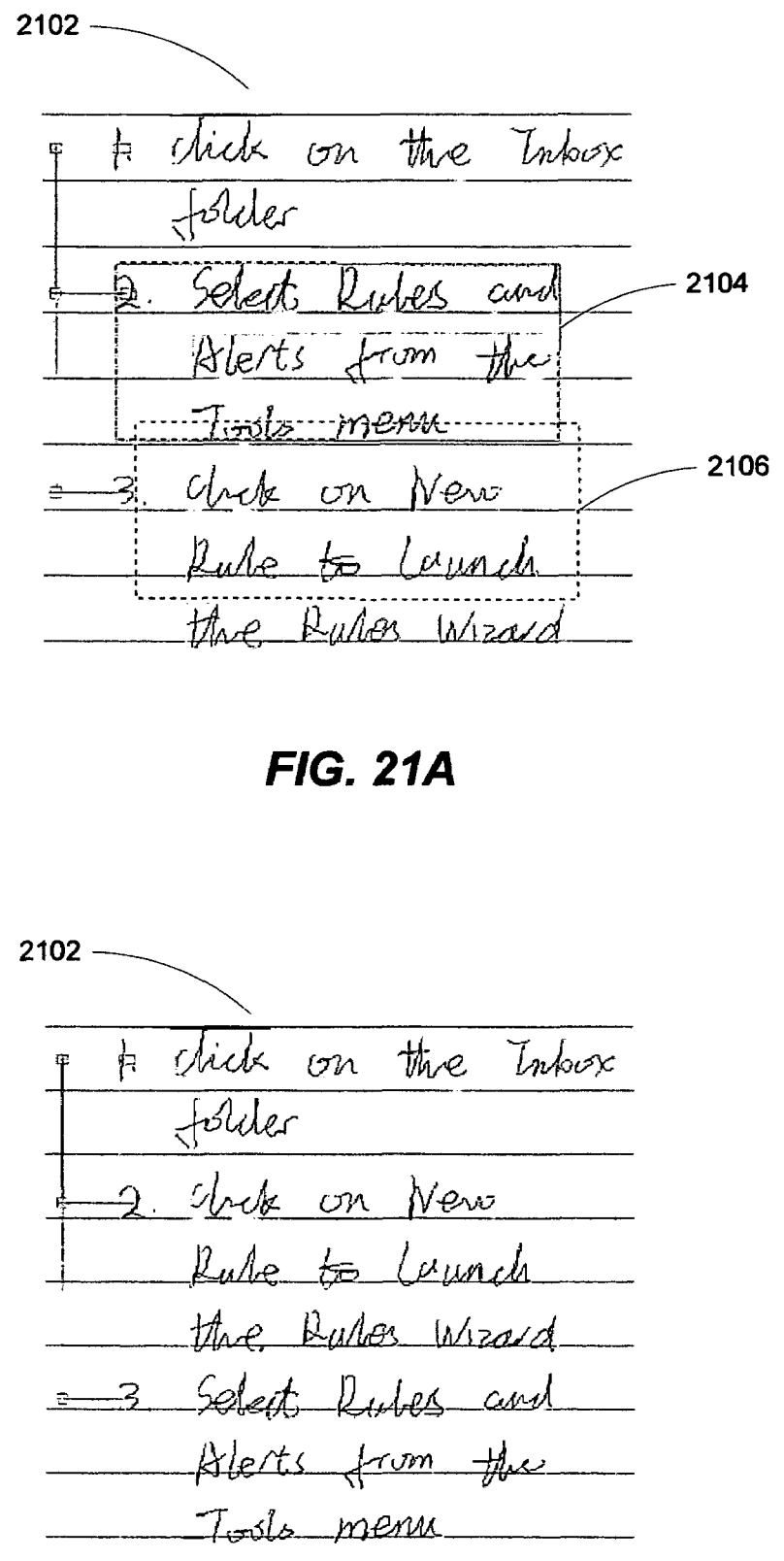

FIGS. 21A-21B present exemplary illustrations generally representing reordering a list item in a recognized list. For example, recognized list 2102 is illustrated in FIG. 21A with the second numbered list item surrounded by a dash-line bounding box 2104. The dash-line bounding box may be dragged to the position indicated by the dash-line bounding box 2106. It may consequently be determined that the second numbered list item should be substituted with the third numbered item in the list. FIG. 21B illustrates the list 2102 after the contents of the list items have been reordered.

Figure 22:
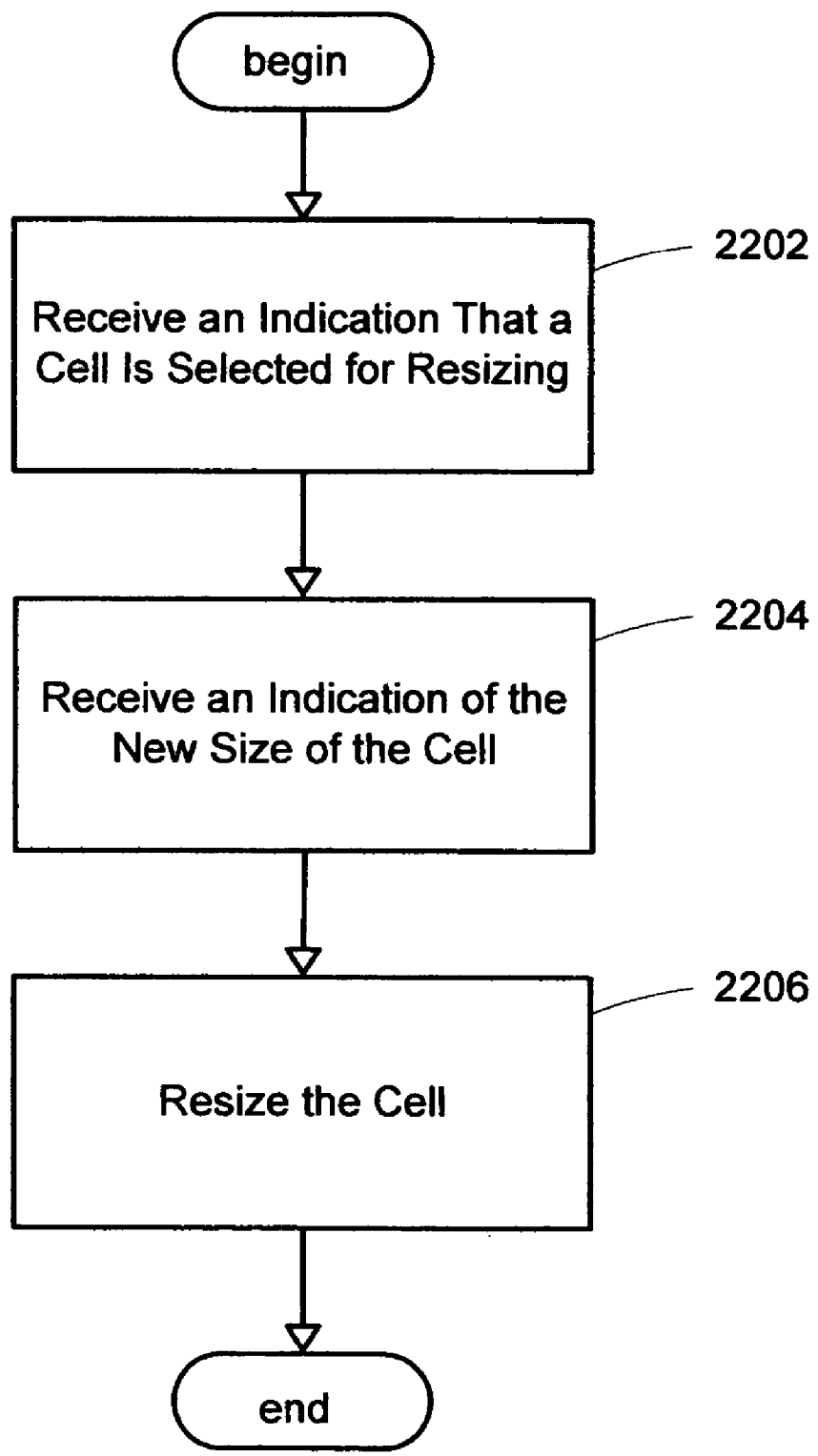
FIG. 22 is a flowchart generally representing one embodiment of the steps undertaken for resizing a row or column of cells in a recognized table by direct manipulation of the ink object, in accordance with an aspect of the present invention.

FIG. 22 presents a flowchart generally representing one embodiment of the steps undertaken for resizing a row or column of cells in a recognized table by direct manipulation of the ink object. At step 2202, an indication may be received that a cell in a recognized table may be selected for resizing. For example, an indication may be received that a cell in a recognized table may be selected for resizing when the cursor of a mouse may hover over a border of the cell and the system may change the cursor type in an embodiment to indicate that the cells can be resized. The left button of the mouse may then be clicked to initiate a drag and drop operation.

At step 2204, an indication may be received for the new position of the border of the cells of the recognized table. For instance, the user may drag the borders of a row or column of cells to new positions and thereby indicate the new size of the cells. At step 2206, the cells may be resized. As the mouse may be moved, a dash-line representing the borders of cells may be moved with the same offset as that of the mouse position. When the mouse button may be released, the borders of the cells may be dropped at their new positions. In an embodiment, such resizing may be implemented by translating and resizing the appropriate strokes of the table.

Figure 23A:
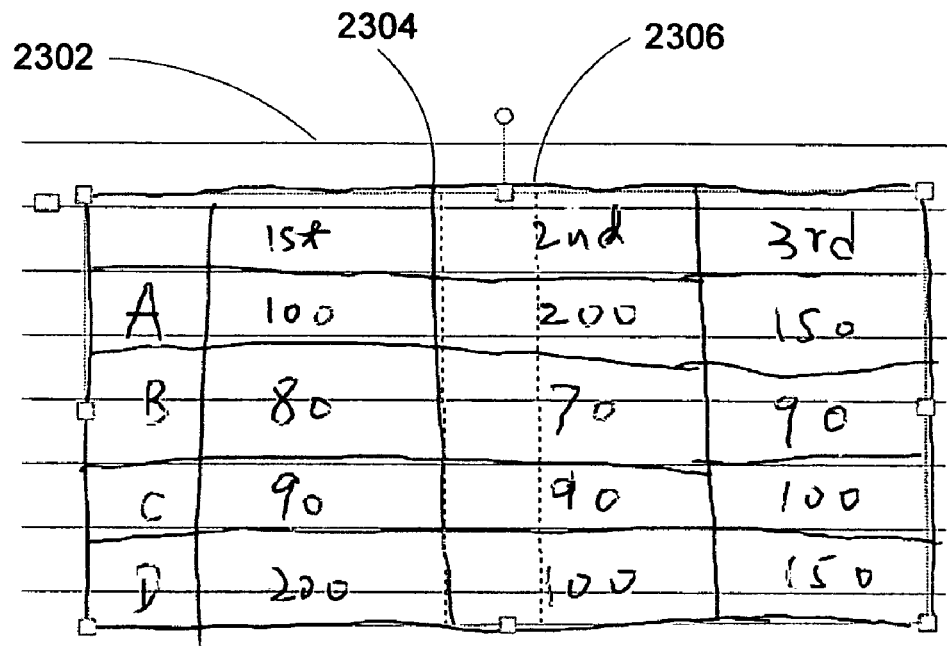
FIGS. 23A-23B are exemplary illustrations generally representing resizing a row or column of cells in a recognized table, in accordance with an aspect of the present invention.
Figure 23B:
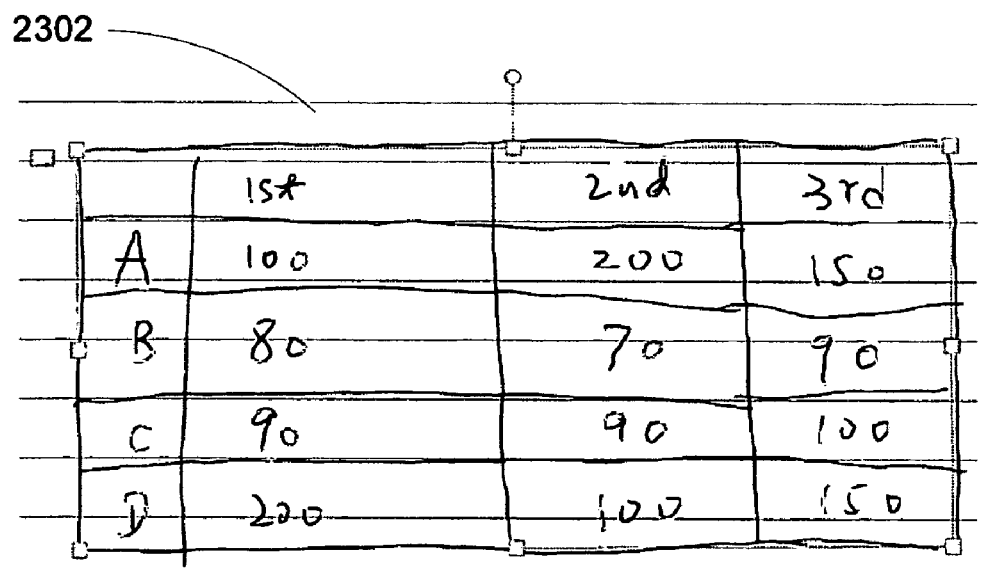

FIGS. 23A-23B present exemplary illustrations generally representing resizing a row or column of cells in a recognized table. For example, recognized table 2302 is illustrated in FIG. 23A with the cell borders adjacent to the second and third columns highlighted by a dash-line 2304 indicating that these cell borders have been selected as part of a drag and drop operation. The dash-line may be dragged to the position indicated by the dash-line 2306 for resizing the second and third columns of cells. FIG. 23B illustrates the table 2302 after the columns of the cells in the table have been resized.

Figure 24:
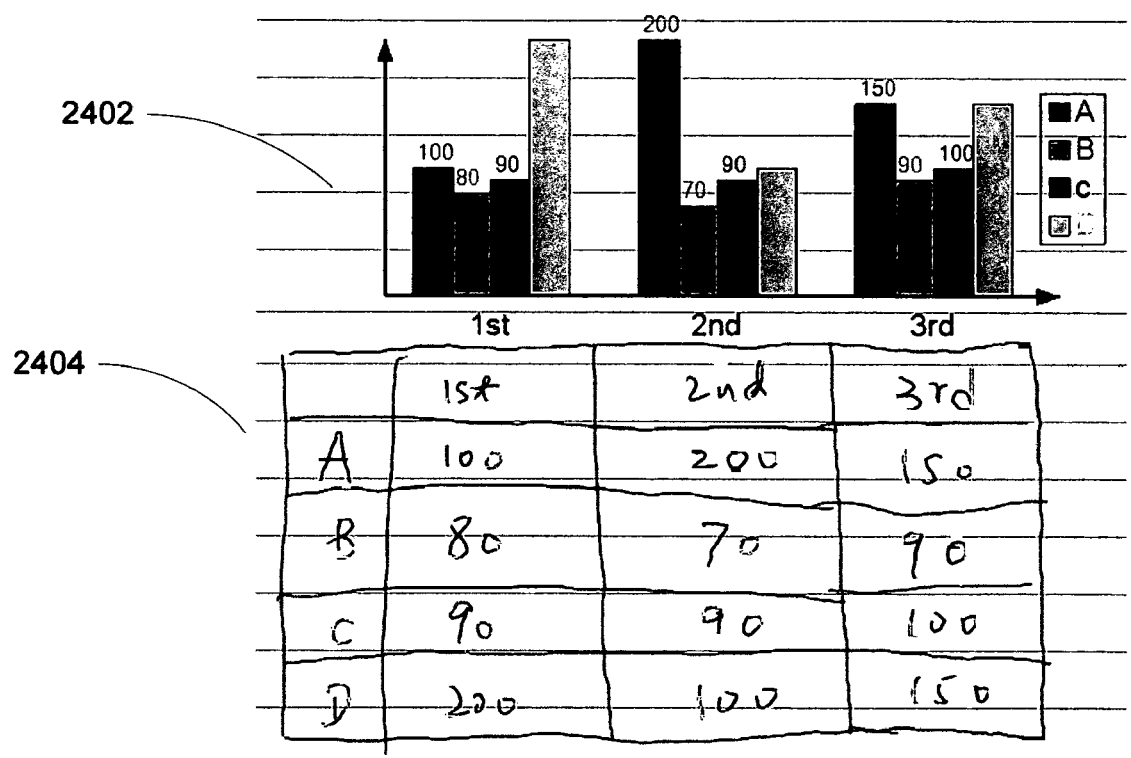
FIG. 24 is an exemplary illustration generally representing visualizing the contents of a recognized table with a chart such as a bar graph, in accordance with an aspect of the present invention.

Additional editing operations may also be performed for a recognized table. In an embodiment, a menu of editing operations from a widget may be displayed for a table. For example, an editing operation such as horizontal may rotate the table to make it horizontal. This may be implemented by rotating the strokes of the table with the angle between the table's base line and the x-axis provided by the ink parser. Other editing operations may include aligning the contents to the left of the corresponding cells, aligning the contents to the right of the corresponding cells, aligning the contents to the top of the corresponding cells, aligning the contents to the bottom of the corresponding cells, and aligning the contents to the center of corresponding cells. These editing operations to align content may be implemented by translating the strokes of the contents with appropriate offsets. The contents of a table may also be visualized by a chart using a visualization editing operation. For example, FIG. 24 may present an exemplary illustration generally representing visualizing the contents of a table 2404 with a bar graph 2402. In an embodiment, a bar graph may be rendered with the recognition results of the contents of a recognized table. For instance, a handwriting recognizer may be used to recognize the contents of the table.

Any number of editing operations may be supported by the described system and method for a recognized ink object. The system and method may be used to recognize any type of hand-drawn ink object by providing an appropriate type of ink object recognizer. Furthermore, any number of ink object recognizers may be used by the present invention to recognize particular ink objects and various ink object editors may edit those particular ink objects. Thus, the system and method provided are flexible and extensible. Once the type of ink object may be recognized, the ink object may be edited and the ink representing the edited ink object may be regenerated. Additional editing operations may then be performed on the ink object or additional ink input may be received.

As can be seen from the foregoing detailed description, the present invention provides a system and method for editing ink objects recognized in ink input. Advantageously, the system and method are insensitive to stroke input order and the number of strokes that may form an ink object. By using the present invention, a user may draw ink objects freely and without restrictions on the hand-drawn input. The structure of the ink object may be recognized, edited, and the ink regenerated for the edited ink object. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for editing ink input, comprising:
    an ink parser for recognizing a hand-drawn chart in ink input;
    a chart editor operably coupled to the ink parser for editing the hand-drawn chart recognized by the ink parser;
    a receiver for receiving an indication that a container within a recognized chart has been moved, the moved container being connected to at least one other container with a connector of a specified type;
    a reflowing module for reflowing the connector from the moved container to the other container based on the type of connector; and
    a mode recognizer operably coupled to the chart editor for switching between inking mode for receiving ink input and ink editing mode for editing the hand-drawn chart recognized in the ink input.

2. The system of claim 1 wherein the ink parser comprises an operably coupled chart detector having a container detector for detecting the containers within ink input and a connector detector for detecting the connectors within ink input.

3. The system of claim 1 wherein the ink parser comprises a chart recognizer for recognizing a hand-drawn chart in ink input.

4. A method in a computer system for editing ink input, comprising:
    receiving ink input;
    parsing the ink input;
    performing chart recognition for an ink object in the ink input;
    switching to an editing mode to edit the chart;
    editing the chart by performing an ink editing operation;
    receiving an indication that a container within a recognized chart has been moved, the moved container being connected to at least one other container with a connector of a specified type;
    reflowing the connector from the moved container to the other container based on the type of connector; and
    regenerating the ink representing the edited chart.

5. The method of claim 4 further comprising performing shape recognition to recognize containers and connectors detected within the ink input.

6. The method of claim 4 wherein editing the chart by performing an ink editing operation comprises creating a bounding box for the chart and receiving an indication that the bounding box for the chart is selected.

7. The method of claim 4 wherein editing the chart by performing an ink editing operation comprises displaying resize selection handles for drawing parts of the chart and receiving an indication that one of the selection handles for the drawing parts of the chart is selected.

8. The method of claim 4 wherein editing the chart by performing an ink editing operation comprises creating a bounding box for a container in the chart and receiving an indication that the bounding box for the container in the chart is selected.

9. The method of claim 4 wherein editing the chart by performing an ink editing operation comprises moving a container in the chart to another position in the chart.

10. The method of claim 4 further comprising switching to inking mode to receive additional ink input.

11. A computer-readable memory having computer-executable instructions for performing the method of claim 4.

12. The method of claim 4, wherein the relative positions between the joint points and the containers remain unchanged.

13. The method of claim 4, further comprising generating a new backbone in the reflowed connector such that the new backbone comprises the minimal Manhattan distance between the backbone's start and end points.

14. The method of claim 4, wherein the ink editing operation comprises regularizing the chart by changing common connectors of the chart to normal connectors, the regularizing including reflowing one or more connectors such that the line segments between the start and end point of a backbone are either horizontal or vertical.

15. The method of claim 4, wherein, if the connector type is normal, the connector is reflowed such that the connector comprises one or more horizontal and/or vertical line segments linking the moved container to the other container.

16. The method of claim 4, wherein, if the connector type is common, the connector is reflowed such that the connector comprises a curved line segment that conforms based on the moved position of the moved container, such that the curved line segment links the moved container to the other container.

17. The method of claim 4, wherein, if the connector type is straight, the connector is reflowed such that the connector comprises a straight line segment that conforms based on the moved position of the moved container, such that the straight line segment links the moved container to the other container.

18. A method in a computer system for editing ink input, comprising:
    receiving ink input;
    parsing the ink input;
    performing chart recognition for an ink object in the ink input;
    switching to an editing mode to edit the chart;
    editing the chart by performing an ink editing operation, wherein the ink editing operation includes:
        deforming a backbone of a connector linking a moved container of the chart; and
        regenerating the strokes of the connector; and
    regenerating the ink representing the edited chart.

19. The method of claim 18, wherein deforming the backbone of the connector comprises performing normal connector deformation.

20. The method of claim 18 wherein deforming the backbone of the connector comprises performing straight connector deformation.

* * * * *